United States Patent
Yoshida et al.

(10) Patent No.: US 6,327,510 B1
(45) Date of Patent: Dec. 4, 2001

(54) PLANT SUPERVISORY SYSTEM

(75) Inventors: Yutaka Yoshida, Hino; Koki Yanagawa, Tokorozawa; Takuji Tahara, Kokubunji; Shoichi Sano, Chofu; Hideki Takahashi, Fuchu; Haruyoshi Iwase, Tachikawa; Koji Saito, Kawasaki; Takahiro Yamamoto, Fuchu, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/233,195

(22) Filed: Jan. 20, 1999

(30) Foreign Application Priority Data

Jan. 21, 1998 (JP) .................................................. 10-009627

(51) Int. Cl.$^7$ ...................................................... G05B 15/02
(52) U.S. Cl. ................................................ 700/9; 700/169
(58) Field of Search ...................... 700/9, 169; 707/523, 707/200; 370/221, 217; 340/825.06, 825.52

(56) References Cited

U.S. PATENT DOCUMENTS

| | | |
|---|---|---|
| 4,280,060 | 7/1981 | Kure-Jensen et al. . |
| 4,607,256 * | 8/1986 | Henzel ............................ 340/825.52 |
| 4,680,581 * | 7/1987 | Kozlik et al. ................... 340/825.06 |
| 4,964,120 * | 10/1990 | Mostashari .......................... 370/228 |
| 5,016,244 * | 5/1991 | Massey, Jr. et al. ................. 370/217 |
| 5,023,832 * | 6/1991 | Fulcher, Jr. et al. ................. 707/200 |
| 5,258,652 | 11/1993 | Nigawara et al. . |
| 5,379,278 * | 1/1995 | Safadi ................................. 370/221 |
| 6,029,181 * | 2/2000 | Milakovich et al. ................. 707/523 |

FOREIGN PATENT DOCUMENTS

| | | |
|---|---|---|
| 44 43 617 | 6/1996 | (DE) . |
| 196 14 748 | 10/1997 | (DE) . |
| 0 732 654 | 9/1996 | (EP) . |
| 7-191934 | 7/1995 | (JP) . |
| 8-234813 | 9/1996 | (JP) . |
| 9-198323 | 7/1997 | (JP) . |
| 10-11115 | 1/1998 | (JP) . |

* cited by examiner

Primary Examiner—William Grant
Assistant Examiner—Ronald D Hartman, Jr.
(74) Attorney, Agent, or Firm—Oblon, Spivak, McClelland, Maier & Neustadt, P.C.

(57) ABSTRACT

In a plant supervisory system, many computers (functional servers) that distributively perform functions are connected through two types of transmission paths (such as a control bus and an information bus). The control bus is used to transmit periodic data such as process data. Event data is transmitted through the information bus. Thus, many computers can be connected. In addition, the latest value of process data can be referenced by each computer.

11 Claims, 35 Drawing Sheets

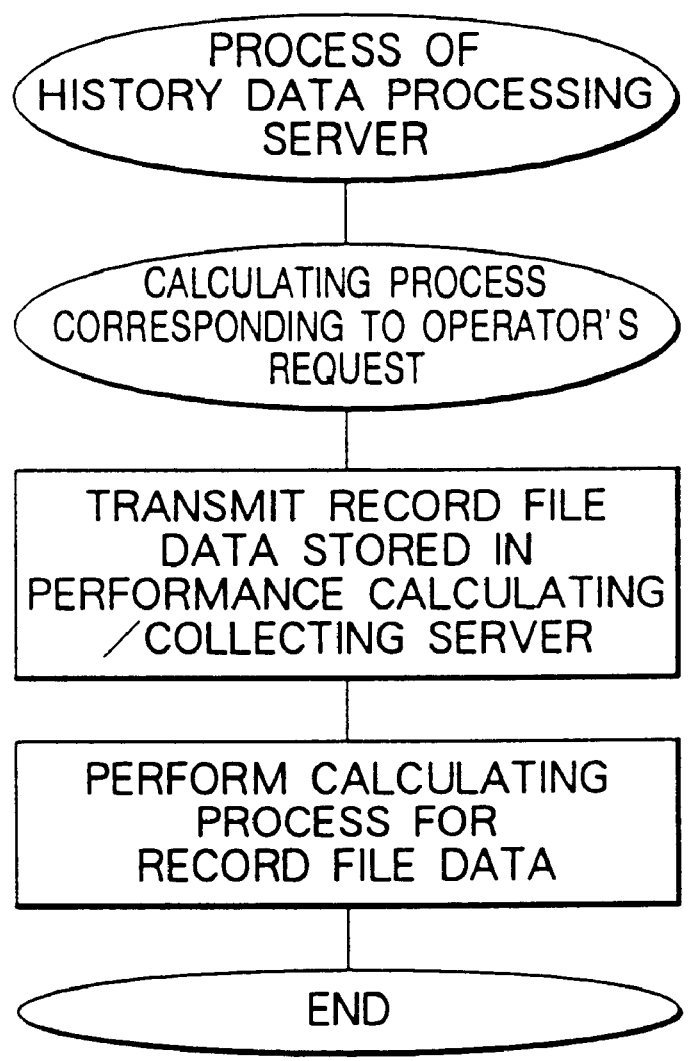

PLANT SUPERVISORY SYSTEM

BACKGROUND OF THE INVENTION

1. Field of the Invention

The present invention relates to a plant supervisory system for supervising a process of a plant such as a nuclear power plant.

2. Description of the Related Art

In a conventional plant supervisory system, as shown in FIG. 22, when a plurality of computers 41 distributively processing functions, the computers 41 are connected with a shared memory unit 42 so as to share and exchange data thereamong.

Since process data is input from a control unit 43 of the plant to the computers 41 that distributively perform calculating processes, the process data is written to the shared memory unit 42 in such a manner that the computers 41 can reference the process data stored in the shared memory unit 42. And since it is necessary to exchange data among the computers 41, this exchanging is performed through the shared memory unit 42.

Thus, in the conventional function distributed plant supervisory system, the computers 41 are connected with the shared memory unit 42. Thus, the number of the computers 41 connected with the shared memory unit 42 depends on the storage capacity thereof. In other words, the number of the computers 41 connected with the shared memory unit 42 is restricted. Thus, many computers 41 cannot be connected. To solve this problem, a constitution of which several computers 41 share functions has been used.

In a plant supervisory system, it is desired to use small computers that distribute a process because of simple system constitution and easy functional expandability corresponding to desired functions and hardware scale. From this point of view, as a means for connecting computers, a method using a network has been proposed.

When computers 41 are connected through a network 44 as shown in FIG. 23, the number of computers 41 that can be connected increases. In fact, the number of computers 41 that can be connected is not restricted. Thus, the above-described problem can be solved.

On the other hand, to supervise the current state of the plant, each computer 41 should always reference the latest plant data. As shown in FIG. 22, in the system of which the computers 41 are connected with the shared memory unit 42, while a large amount of data is being exchanged among the computers 41, process data received from the control unit 43 can be written to the shared memory unit 42. Thus, the update time of the process data does not affect a process performed by the computers 41.

However, when computers 41 are connected through a network, since data that is exchanged among the computers 41 disturbs transmission of process data that is input from the control unit 43. Thus, the latest process data cannot be supplied to each computer 41.

The amount of data exchanged among the computer 41 largely varies corresponding to an operation of the operator and a state change of the plant. Thus, the amount of data transmitted on the network 44 varies. When the amount of data transmitted on the network 44 increases and exceeds the data transmission capacity of the network 44, the control unit 43 cannot transmit process data to each computer 41. Alternatively, process data transmitted from the control unit 43 to each computer 41 delays. Thus, it is very difficult to shorten the update time of the process data to a predetermined value or less.

As described above, in a plant supervisory system, because of simple system constitution and easy functional expandability corresponding to desired functions and hardware scale, it was desired to distribute a process with small computers. However, in the conventional system of which computers are connected with a shared memory unit, the number of computers connected with the shared memory unit is restricted. In other words, many computers cannot be connected.

To solve such a problem, a method for connecting much more computers through a network has been proposed. However, in this method, plant data may delay corresponding to the amount of data transmitted on the network. Thus, each computer cannot reference and process the latest plant data.

In addition, when small computers are connected through a network and a process is distributed thereamong, there are problems (1) to (5) that follow.

In such a plant supervisory system, a computer that processes each function is referred to as functional server. Examples of functional servers are a supervising server, a data collecting server, a performance calculating server, a plant operation assisting server, and an information managing server. The supervising server inputs process data, determines whether or not a process value is proper, and outputs the determined result. The data collecting server collects process data and stores the operation history of the plant. The performance calculating server performs a plant performance evaluating calculation corresponding to plant data. The plant operation assisting server outputs operation and guide information for an automatic plant operation and guide information for a plant unit operation test. The information managing server stores data received from each server. A computer that inputs process data and outputs the current value of the plant is referred to as a display control station. The display control station is an important unit that allows the operator of the plant to know the state of the plant.

(1) In the case that functional servers are redundantly constituted, if one functional server is broken down, data should be transferred to a backup functional server. However, the defective functional server cannot transfer data to the backup server.

(2) In a nuclear power plant, TIP (Traversing Incore Probe) level should be periodically measured so as to obtain a real output distribution in the core of the reactor. The TIP level is normally measured by inserting a traversing incore probe into the core of the reactor. The TIP is traveled in the core. Position signals at around several hundred measurement positions are output. When the TIP position signals are output, TIP level signals are read. The TIP position signals are output from a TIP control unit at intervals of milliseconds. However, since the load applied to the CPU of a functional server fluctuates, it is difficult to collect the TIP level signals at high speed (on millisecond order). Thus, a data drop may take place.

(3) When a function for comparing control rod sequences of the reactor is shared with another function by a server, the responsiveness of a control rod operation prohibition signal deteriorates.

(4) Conventionally, a control command is output from a computer to the control unit through the network. When the responsiveness of which a computer directly controls the control unit is required, it is difficult to control the control unit through the network.

(5) If an error takes place in the plant, a high speed data recording server collects information of a plant operation and analyzes the collected information. Thus, the high speed data recording server should collect process data at high speed without a data drop. Consequently, data that is buffered in time series by the process data input unit is transmitted. On the other hand, a functional server should use the current instantaneous value of the plant. Thus, conventionally, a first input unit that buffers process data and then transmits the buffered data and a second input unit that transmits an instantaneous value are used. The first input unit transmits data to the high speed recording server through its dedicated transmission path. The second input unit transmits data to a functional server through its dedicated transmission path. Thus, conventionally, two different process data input units are required.

SUMMARY OF THE INVENTION

The present invention is made from the above-described point of view. An object of the present invention is to provide a plant supervisory system having many computers connected in such a manner that the latest value of process data can be referenced by each computer.

Another object of the present invention is to provide a plant supervisory system having redundantly constituted functional servers connected through a network in such a manner that even if one of them gets defective, data thereof is transferred to another functional server.

Another object of the present invention is to provide a plant supervisory system having a functional server connected through a network in such a manner that plant data can be collected at high speed (on millisecond order).

Another object of the present invention is to provide a plant supervisory system having a functional server connected through a network in such a manner that the responsiveness of a control rod operation prohibition signal is improved.

Another object of the present invention is to provide a plant supervisory system having a functional server connected through a network in such a manner that the responsiveness is improved.

Another object of the present invention is to provide a plant supervisory system that allows one process data input unit to collect data at high speed and to input/output current value data.

To accomplish such objects, the present invention has the following constitutions.

A first aspect of the present invention is a plant supervisory system for inputting process data of a plant from a control unit and supervising the plant, comprising a plurality of functional servers for inputting the process data and distributively performing calculating processes necessary for supervising the plant, a first transmission path for transmitting data shared with in the control unit and the functional servers, and a second transmission path for transmitting data shared with in the functional servers.

In the plant supervisory system according to the first aspect of the present invention, data with a relatively constant amount such as data of process amount of each plant unit is transmitted among a control unit and each functional server through a first transmission path. Each functional server performs a calculating process with process data that is input through the first transmission path. Data with a nonconstant amount is exchanged among each functional server through a second transmission path. Since the process data and data with a non-constant amount are transmitted through different transmission paths. Thus, many computers can be connected. In addition, the process data can be prevented from delaying. Consequently, the latest value of the process data can be referenced by each computer.

A second aspect of the present invention is the plant supervisory system of the first aspect of the present invention, wherein said first transmission path is a control bus for transmitting said process data from said control unit or a sensor of the plant to either functional servers, and output data of said functional servers to said control unit with a high speed period required for plant control; and said second transmission path is a information bus for transmitting the data, whose amount varies depending on the event process of said functional server, to other functional servers.

A third aspect of the present invention is the plant supervisory system of the first aspect of the present invention, wherein said functional servers include a display control station for inputting the process data and output data of the other functional servers and displaying information of the plant.

In the plant supervisory system according to the third aspect of the present invention, a display control station performs a displaying process with process data that is input from a control unit through a first transmission path. Data is shared with in the display control station and other functional servers through a second transmission path. Thus, many computers can be connected. In addition, the latest value of the process can be supervised.

A fourth aspect of the present invention is the supervising system of the first aspect of the present invention, wherein the functional servers include a supervising server for inputting the process data and determining whether or not the process data is abnormal corresponding to a state change of the plant, the variation of process amount of the supervising server being large, and a performance calculating server for inputting the process data and periodically performing a performance evaluating calculation for the plant, the process amount of the performance calculating server being constant.

In the plant supervisory system according to the fourth aspect of the present invention, functional servers that perform calculating processes are categorized as a performance calculating server and a supervising server. The performance calculating server performs a periodic process. The supervising server performs an event process. The performance calculating server and the supervising server are connected through a first transmission path and a second transmission path. Thus, the event process for calculating data with a large amount in short time and the periodic process are performed without mutual interference. Consequently, the latest value of process data can be effectively supervised.

A fifth aspect of the present invention is the plant supervisory system of the first aspect of the present invention, wherein the functional servers include a supervising server for inputting the process data and determining whether or not the process data is abnormal corresponding to a state change of the plant, a plant operation assisting server for inputting the process data and assisting the operation of the plant, a data collecting server for inputting the process data and collecting history data of the plant, and a history data processing server for extracting history data of the data collecting server through the second transmission path and outputting the extracted history data, wherein at least the supervising server and the data collecting server are redundantly constituted.

In the plant supervisory system according to the fifth aspect of the present invention, an optimum constitution can be accomplished corresponding to the reliability required for each function.

A sixth aspect of the present invention is the plant supervisory system of the first aspect of the present invention, wherein the functional servers include an information managing server for inputting, storing, and managing the process data and output data of the other functional servers.

In the plant supervisory system according to the sixth aspect of the present invention, since an information managing server is disposed, the number of storage units of other functional servers can be minimized. Thus, a plant supervisory system with high reliability and easy maintainability can be accomplished at relatively low cost.

A seventh aspect of the present invention is the plant supervisory system of the sixth aspect of the present invention, wherein the other functional serves are redundantly constituted, and wherein one of the redundantly constituted functional servers is transferred to the other thereof with data stored in the information managing server through the second transmission path.

In the plant supervisory system according to the seventh aspect of the present invention, data with a relatively constant amount such as data of process amount of each plant unit is input from a control unit to redundantly constituted functional servers through a first transmission path. An active functional server processes input data and transmits required information to an information managing server through a second transmission path. The information managing server stores information necessary for processing data. If the active functional server gets defective, a backup functional server extracts data stored in the information managing server through the second transmission path and processes the data. Thus, many computers can be connected through a network. In addition, even if an active functional server gets defective, data can be smoothly transferred to a backup functional server.

A eighth aspect of the present invention is a plant supervisory system for inputting process data of a plant and supervising the plant, comprising a traversing incore probe (TIP) control unit for causing a TIP to measure a TIP level corresponding to a control command, a TIP level collecting unit for transmitting the control command to the TIP control unit and collecting the TIP level from the TIP control unit, a display control station for inputting the process data and displaying information of the plant, a TIP server for outputting the control command to the TIP level collecting unit corresponding to a TIP level collection start request that is input through the display control station, and storing data collected by the TIP level collecting unit, a first transmitting path for transmitting data shared with in the TIP level collecting unit and the display control station and in the TIP level collecting unit and the TIP server, and a second transmission path for transmitting data shared with in the display control station and the TIP server.

In the plant supervisory system according to the eighth aspect of the present invention, a display control station outputs and transmits a TIP level collection start request signal to a TIP server through a second transmission path. The TIP server outputs a control command to a TIP level collecting unit (TIP controller) through a first transmission path. The TIP level collecting unit collects a TIP level from the TIP control unit. The TIP level data collected by the TIP level collecting unit is transmitted to the TIP server through the first transmission path. Thus, since the TIP level collecting apparatus is disposed independent from the TIP server, high speed TIP level data on millisecond order can be collected without a data drop.

An ninth aspect of the present invention is a plant supervisory system for inputting process data of a plant and supervising the plant, comprising a first transmission path, a control unit, connected to the first transmission path, for performing a control rod operation corresponding to a control rod operation command and outputting control rod position data, an information managing server for storing and managing control rod sequence data and data transmitted from the control unit through the first transmission path, a display control station for inputting the process data transmitted through the transmission path, displaying information of the plant, receiving a control rod operation request, and outputting the control rod operation command, a rod worth minimizer controller, connected to the first transmission path, for determining whether or not the control rod operation is available corresponding to the control rod sequence received from the information managing server and the control rod position data received from the control unit and outputting a control rod operation prohibition signal to the control unit corresponding to the determined result, and a second transmission path for exchanging data between the information managing server and the display control station.

In the plant supervisory system according to the ninth aspect of the present invention, a rod worth minimizer controller inputs control rod position data from a control unit through a first transmission path. The rod worth minimizer controller compares a control rod sequence received from an information managing server through the first transmission path and control rod position data. When an incorrect operation has been performed, the rod worth minimizer controller outputs a control rod operation prohibition signal to the control unit. The rod worth minimizer controller transmits the compared result to a display control station through the first transmission path. The display control station processes the received data and displays a control rod guide.

Since the rod worth minimizer controller that performs a dedicated process rather than a functional server is connected to the first transmission path, the responsiveness of the control rod operation prohibition signal due to an increase of the load applied to the server can be prevented from deteriorating.

A tenth aspect of the present invention is a plant supervisory system for inputting process data of a plant from a control unit and supervising the plant, comprising a first transmission path and a second transmission path, a display control station for inputting the process data from the control unit through the first transmission path and displaying information of the plant, a functional server for inputting operation information from the display control station through the second transmission path and outputting a target value control command or a unit operation command for the control unit to the first transmission path corresponding to the process data, and an operation output unit for outputting a high speed periodic operation command to the control unit through a dedicated connecting means, corresponding to the target value control command received from the functional server.

In the plant supervisory system according to the tenth aspect of the present invention, a functional server receives operation information from a display control station having an input function of operation information through a second transmission path. The functional server determines an operation state of the plant corresponding to the operation information and process amount and so forth of each unit of the plant received through a first transmission path. The functional server operates a control command, outputs a target value control command that requires a high speed response to an operation output unit through the first transmission path, and outputs an operator's command such as an ON/OFF command to the control unit through the first transmission path. The operation output unit outputs a high speed periodic operation command to the control unit through a dedicated connecting means. Thus, in the network constitution, a plant controlling process that requires a high speed response can be performed.

A eleventh aspect of the present invention is a plant supervisory system for inputting process data of a plant and supervising the plant, comprising a first transmission path, a process data input unit for inputting process data through the first transmission path and performing in parallel a process for outputting an instantaneous value and a process for outputting buffered data of the input process data, a functional server for inputting the instantaneous value from the process data input unit and performing a calculating process for supervising the plant, a high speed data recording server for inputting the buffered data from the process data input unit through the first transmission path and recording the data at high speed, and a second transmission path for exchanging data between the functional server and the high speed data recording server.

In the plant supervisory system according to the eleventh aspect of the present invention, process data is input to a process data input unit and buffered therein. Thereafter, the buffered data is transmitted to a high speed data recording server through a first transmission path. The process data is successively and promptly transmitted to a functional server through the first transmission path. The high speed data recording server records input process data at high speed. A functional server performs a calculating process corresponding to the input process data. Thus, one process data input unit can collect high speed data and transmit instantaneous value data.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 7A, FIG. 7B, FIG. 7C and FIG. 7D are flow charts showing a process of a performance calculating function according to the fourth embodiment of the present invention;

DESCRIPTION OF PREFERRED EMBODIMENTS

Figure 1:
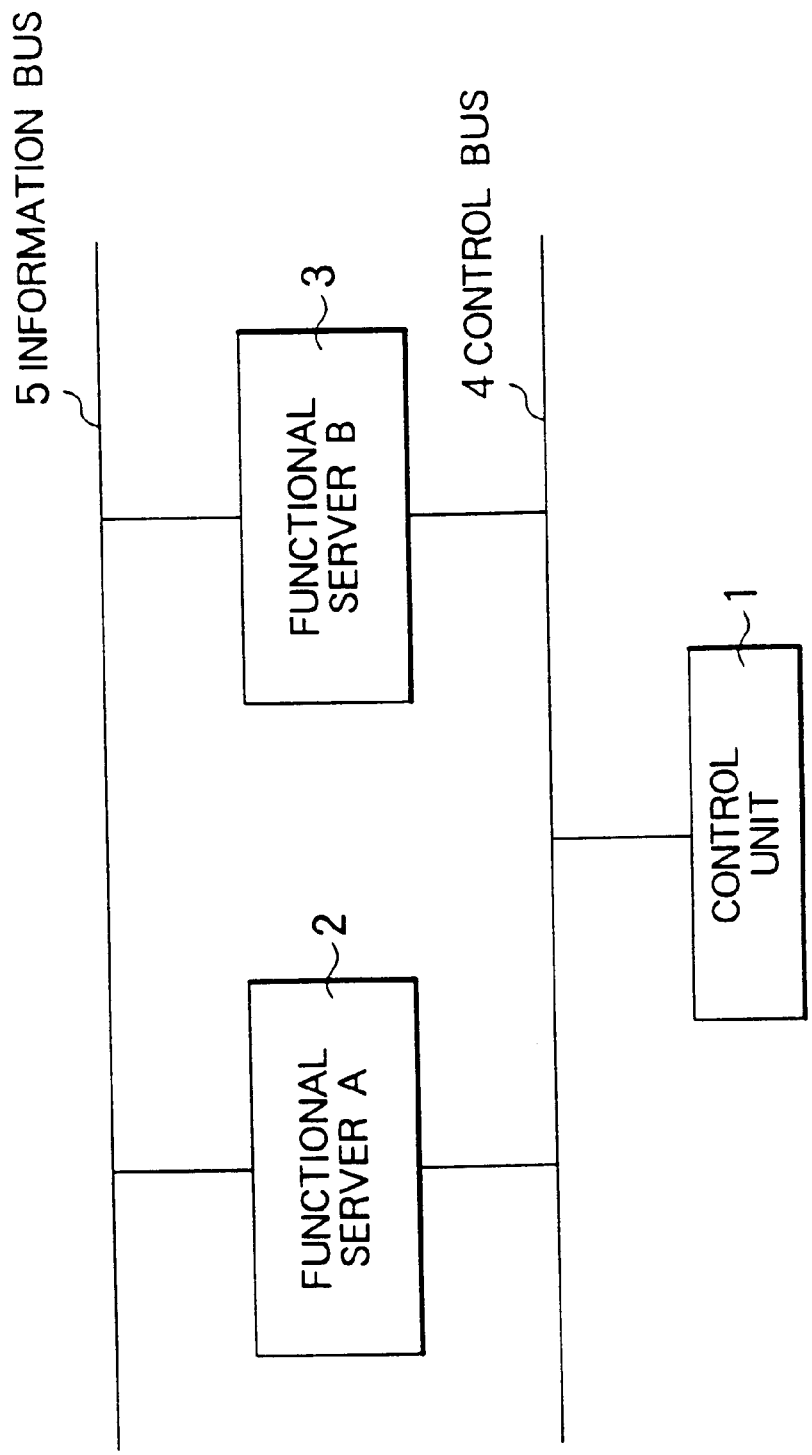
FIG. 1 is a block diagram showing the constitution of a plant supervisory system according to a first embodiment of the present invention.

Next, with reference to the accompanying drawings, preferred embodiments of the present invention will be described. For simplicity, similar portions on each drawings are denoted with similar reference numerals and their description will be omitted.

(First Embodiment)

FIG. 1 is a block diagram showing the constitution of a plant supervisory system according to a first embodiment of the present invention. In the first embodiment, a control unit 1 is connected to a functional server A 2 and a functional server B 3 through a control bus 4. The functional server A 2 and the functional server B 3 are connected through an information bus 5 other than the control bus 4. The functional server A 2 and functional server B 3 are computers that distributively perform functions of the plant supervisory system.

In this constitution, the control unit 1 transmits process data to the functional server A 2 and the functional server B 3 through the control bus 4. The functional server A 2 inputs process data from the control unit 1 and performs a calculating process. As with the functional server A 2, the functional server B 3 inputs process data from the control unit 1 and performs a calculating process. As the result of the calculating process of the functional server A 2, data required by the functional server B 3 is transmitted to the functional server B 3 through the information bus 5. Likewise, as the result of the calculating process of the functional server B 3, data required by the functional server A 2 is transmitted to the functional server A 2 through the information bus 5.

In the constitution shown in FIG. 1, two functional servers are connected. However, it should be noted that the present invention is not limited to such a constitution. In other words, three or more functional servers may be connected. In the example, the control bus 4 is used to transmit process data from the control unit 1 to each functional server. However, when data exchanged between the functional servers is constant-amount data and the amount of transmission data per unit time period is predicable, the data can be transmitted through the control bus 4.

In addition, data (such as plant operation output data) that is output from a functional server to the control unit 1 can be transmitted through the control bus 4. When data such as setting values and control logics are transmitted from a functional server to the control unit 1, the data size of the transmission data and the transmission intervals are preassigned. Corresponding to the size and intervals that have been assigned, the transmission data is divided and transmitted through the control bus 4. Thus, data can be transmitted in such a manner that the amount of transmission data per unit time period does not adversely affect plant data transmitted from the control unit 1 to a functional server.

As described above, in the first embodiment, with two types of transmission paths of the control bus 4 and the information bus 5, many computers can be connected. In addition, each computer can reference the latest value of process data.

(Second Embodiment)

Figure 2:
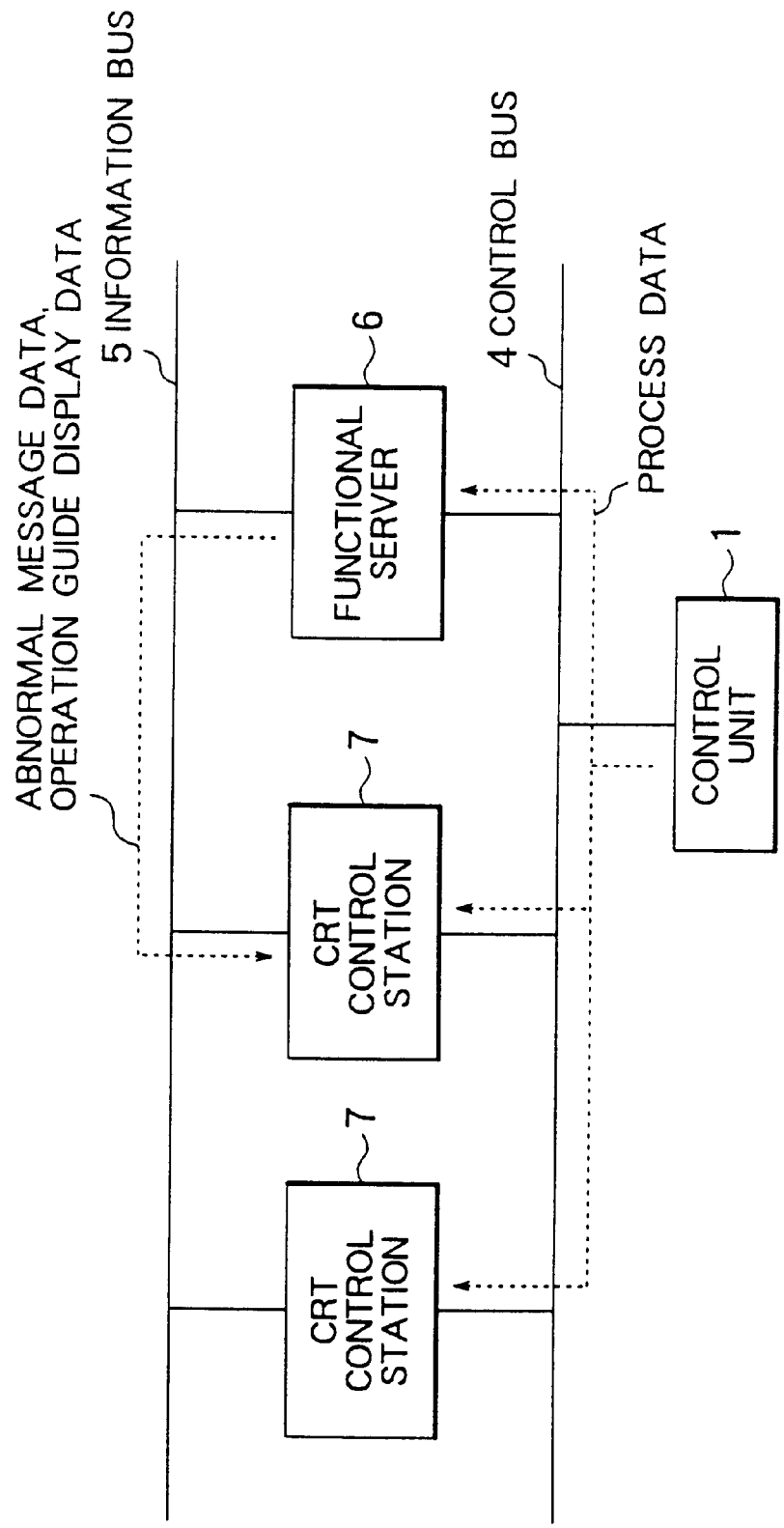
FIG. 2 is a block diagram showing the constitution of a plant supervisory system according to a second embodiment of the present invention.

FIG. 2 is a block diagram showing the constitution of a plant supervisory system according to a second embodiment of the present invention.

In the second embodiment, a functional server 6, a plurality of CRT control stations 7, and a control unit 1 are connected to a control bus 4. In addition, the CRT control stations 7 and the functional server 6 are connected to an information bus 5.

The control unit 1 transmits process data with a relatively constant amount to the functional server 6 and the CRT control stations 7 through the control bus 4. The functional server 6 inputs the process data from the control unit 1 and performs a calculating process. Each of the CRT control stations 7 inputs process data from the control unit 1 and performs a displaying process for plant information. Data required by the CRT control stations 7 as the result of the calculating process of the functional server 6 is transmitted to the CRT control stations 7 through the information bus 5.

Each of the CRT control stations 7 has display data for supervising the plant and a database that represents what value of process data is present at what position of transmission data received from the control unit 1. To supervise process data, each of the CRT control stations 7 may display the results of the calculating process for a plurality of types of process data. The calculating process is performed by the control unit 1. The result of the calculating process is transmitted to the CRT control stations 7 through the control bus 4. Alternatively, each of the CRT control stations 7 stores the content of a calculating process and performs the calculating process and displays the calculated result.

When a limit value of a process and process data are compared and a data color changing process is performed on each CRT, the control unit 1 performs the comparing process and transmits the result of the comparing process to the CRT control stations 7 through the control bus 4 so as to display the result. Alternatively, each of the CRT control stations 7 stores the content of the comparing process, performs the comparing process, and displays the result of the comparing process. Thus, when one of the CRT control stations 7 operates, process data can be supervised.

As a plant supervising function, the functional server 6 detects process data that is abnormal against a limit value of the plant corresponding to the process data that is input through the control bus 4 and generates abnormal message data. As an automatic plant operating function, the functional server 6 determines the state of the plant corresponding to process data that is input through the control bus 4 and generates operation guide display data for the plant operation. When one of the CRT control stations 7 issues a display request for the abnormal message data or the operation guide display data, the functional server 6 transmits such data to only the CRT control station 7 that has issued the request.

Since the data amount of the abnormal message data or the operation guide display data varies depending on the state of the plant, such data is transmitted through the information bus 5. Thus, abnormal message data and operation guide display data can be transmitted without varying the transmission amount of the control bus 4 that transmit process data with a relatively constant amount.

As described above, according to the second embodiment, although the transmission amount of output data of a functional server varies depending on the plant state and the display data, the output data of the functional server is transmitted through the information bus 5. Thus, the latest process data can be supervised without a delay on the control bus 4 through which process data with a relatively constant amount is transmitted at intervals of a predetermined time period.

In addition, when one of the CRT control stations 7 operates, process data can be supervised. Thus, a plant supervisory system that allows process data to be supervised and that is not much affected by a defective CRT control station 7 can be provided. In addition, since each CRT control station 7 can directly input and display process data, the throughput improves after plant state change state until data is displayed.

(Third Embodiment)

Figure 3:
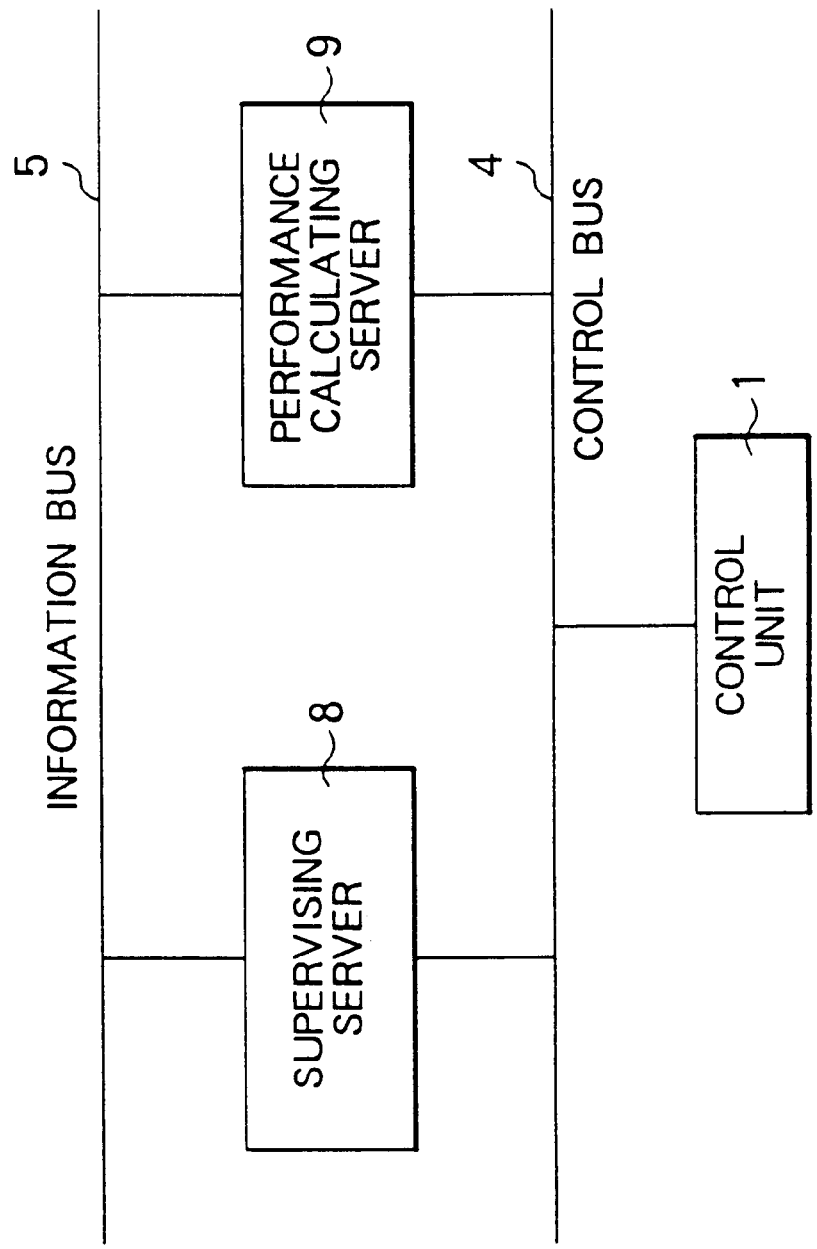
FIG. 3 is a block diagram showing the constitution of a plant supervisory system according to a third embodiment of the present invention.

FIG. 3 is a block diagram showing the constitution of a plant supervisory system according to a third embodiment of the present invention.

In the third embodiment, as the functional server A and the functional server B in the first embodiment, a supervising server 8 and a performance calculating server 9 are used. The supervising server 8 performs an event process. The performance calculating server 9 performs a periodic process. These functional servers are connected to a control bus 4 and an information bus 5. The control bus 4 is used to receive the latest process data. The information bus 5 is used to receive event information that takes place on an irregular basis.

A control unit 1 transmits process data to the supervising server 8 and the performance calculating server 9 through the control bus 4. Each of the supervising server 8 and performance calculating server 9 inputs process data from the control unit 1 and performs a calculating process. The supervising server 8 inputs process data from the control unit 1 and performs an event process such as an alarm generating process due to a state change corresponding to the latest data of the plant. During that period, the performance calculating server 9 continuously performs the periodic process for a plant performance evaluating calculation without an influence of the state change of the plant.

As described, according to the third embodiment, functional servers are connected to a network and the servers are dedicated to an event process and a periodic process, the load applied to the functional servers is reduced. Thus, an event process corresponding to a state change of the plant can be performed with a high speed response without an influence to the periodic process.

(Fourth Embodiment)

Figure 4:
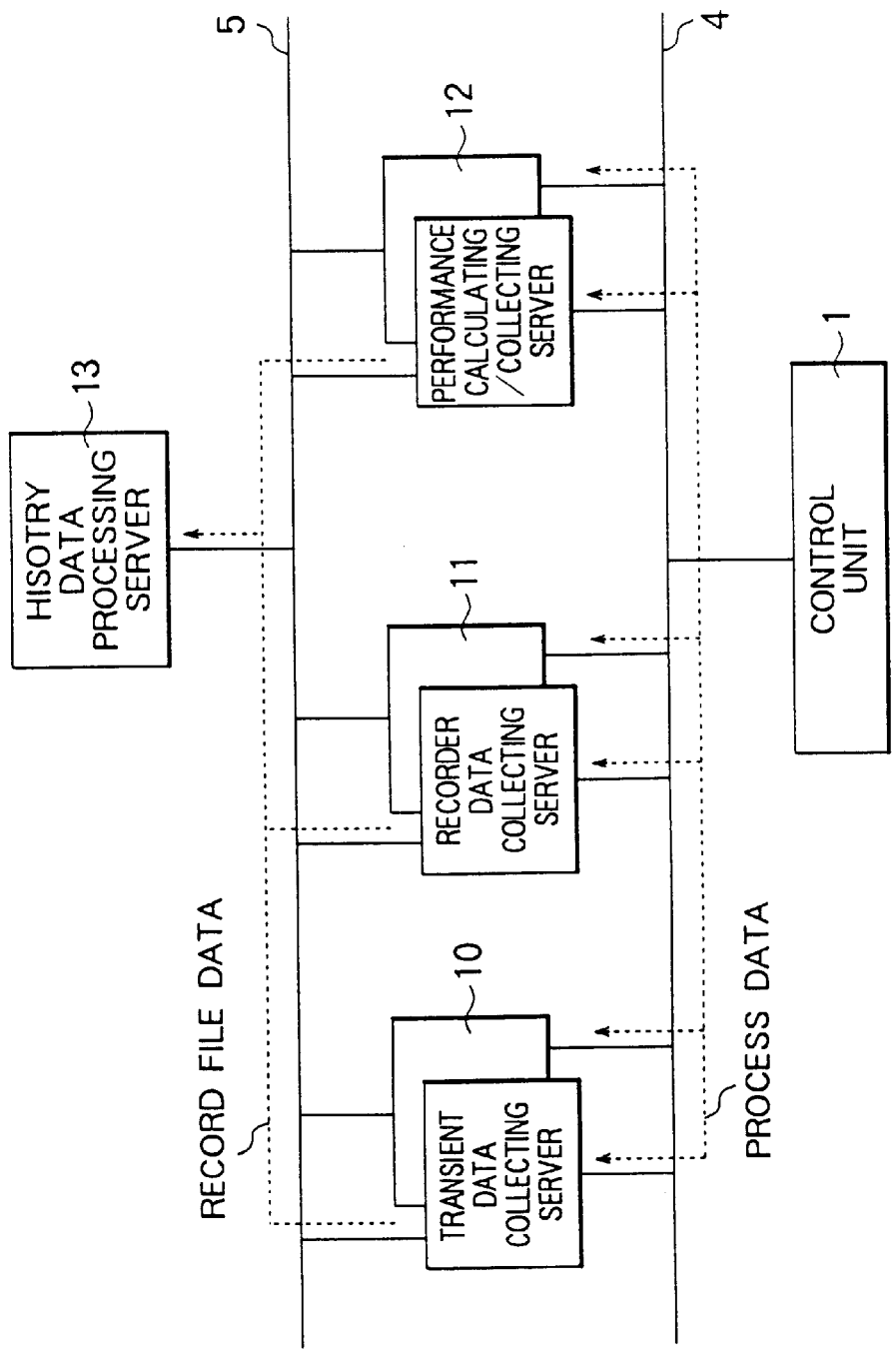
FIG. 4 is a block diagram showing the constitution of a plant supervisory system according to a fourth embodiment of the present invention.
Figure 5A:
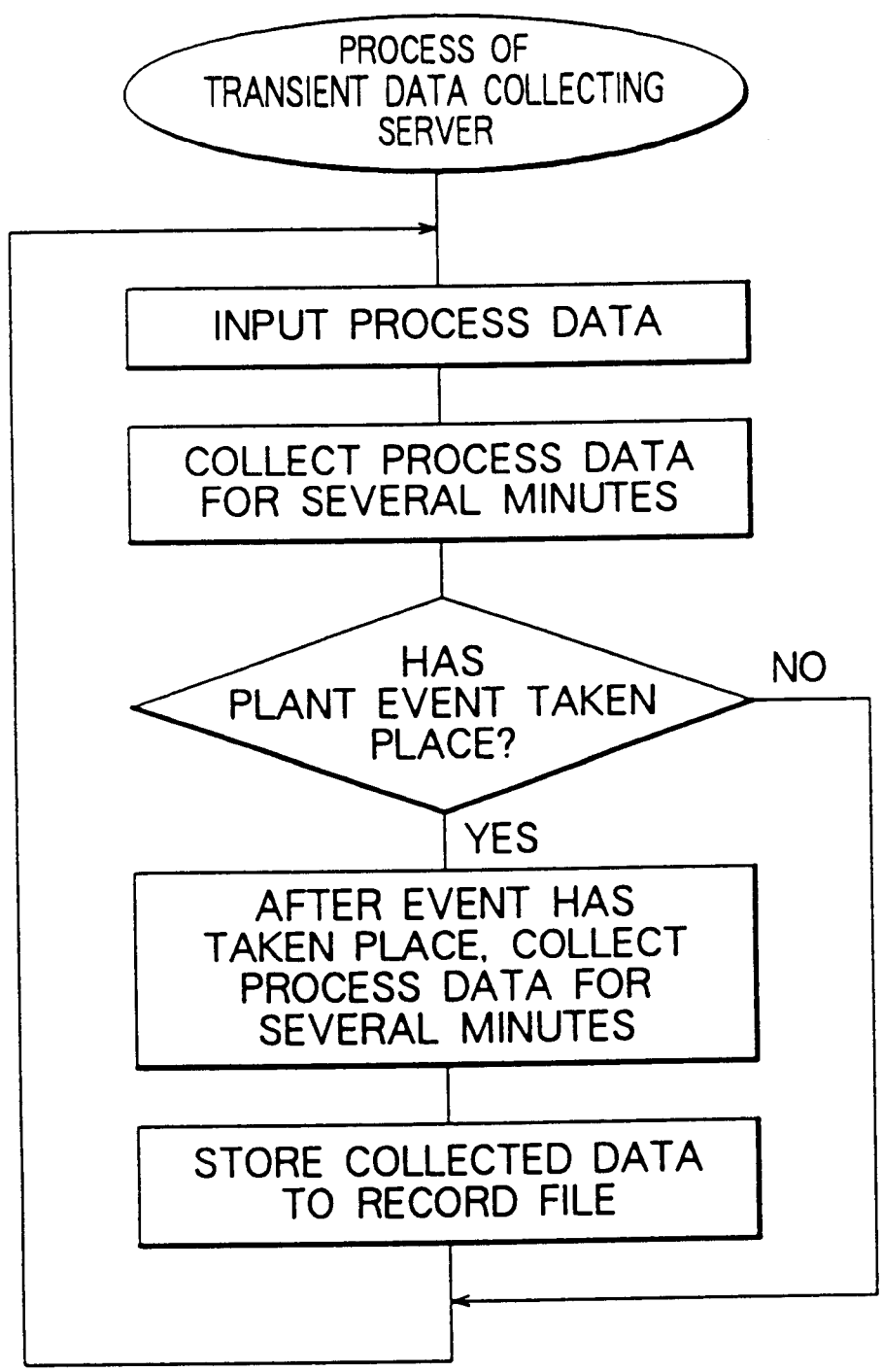
FIG. 5A and FIG. 5B are flow charts showing a process of a transient event recording function according to the fourth embodiment of the present invention.
Figure 5B:
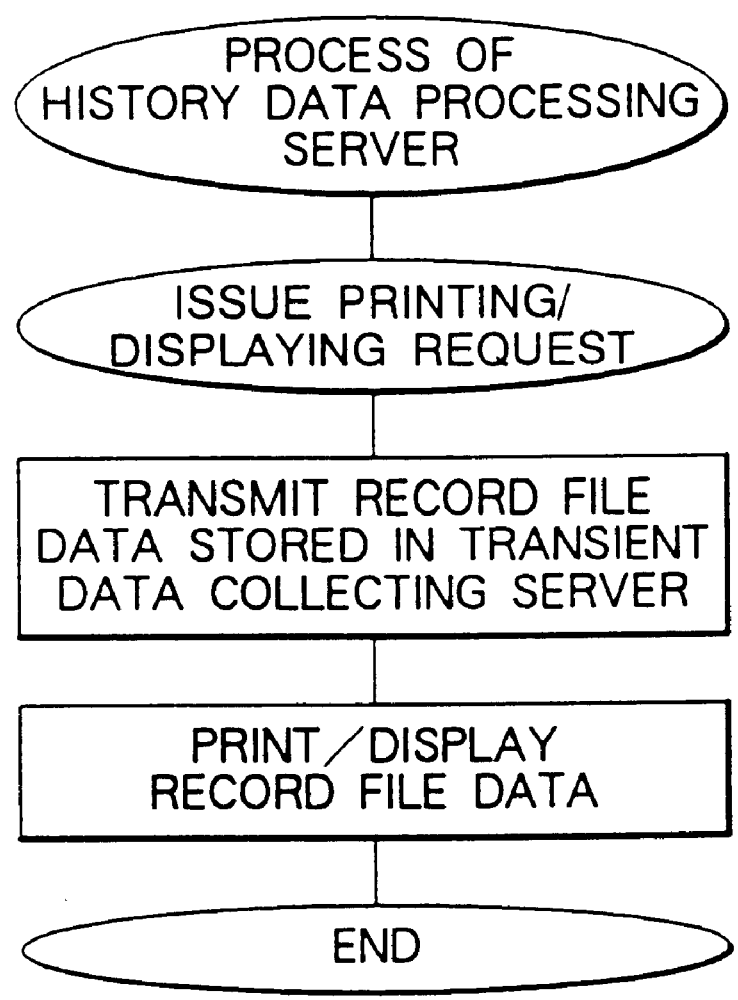
Figure 6A:
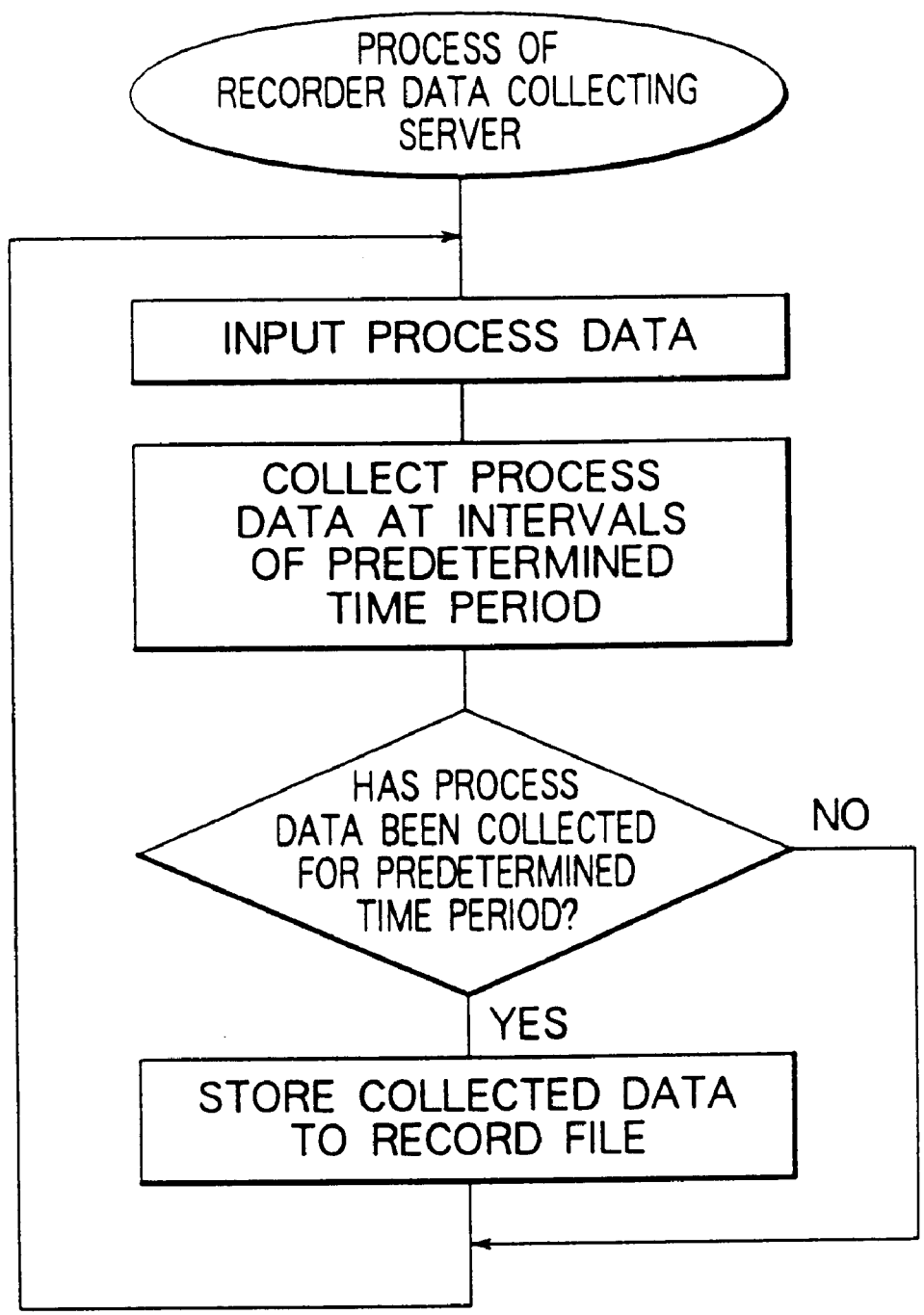
FIG. 6A and FIG. 6B are flow charts showing a process of a recorder function according to the fourth embodiment of the present invention.
Figure 6B:
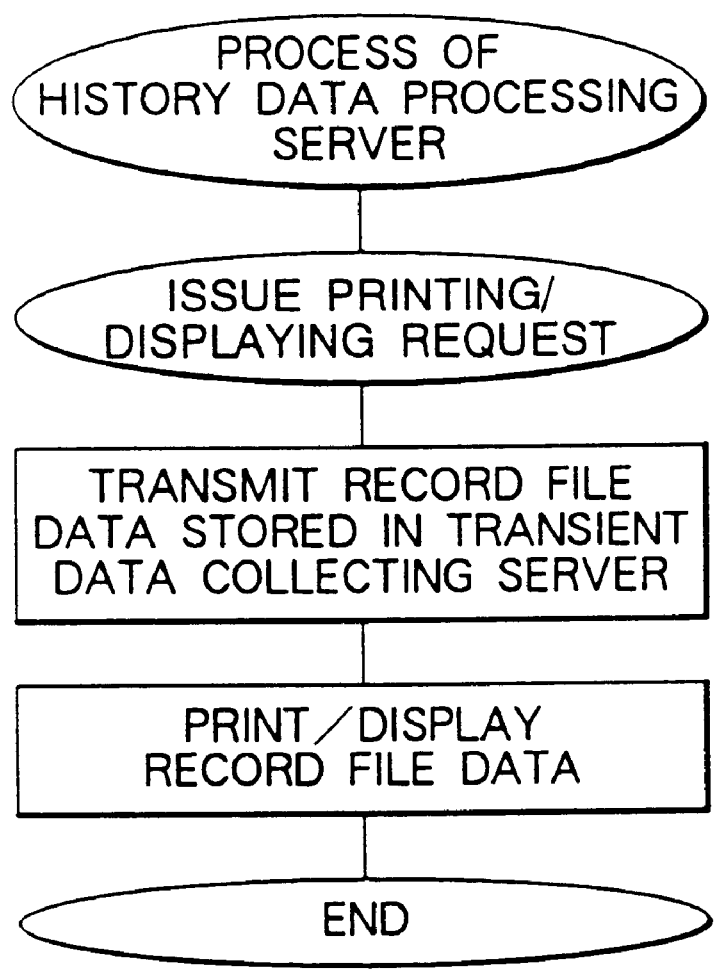
Figure 7A:
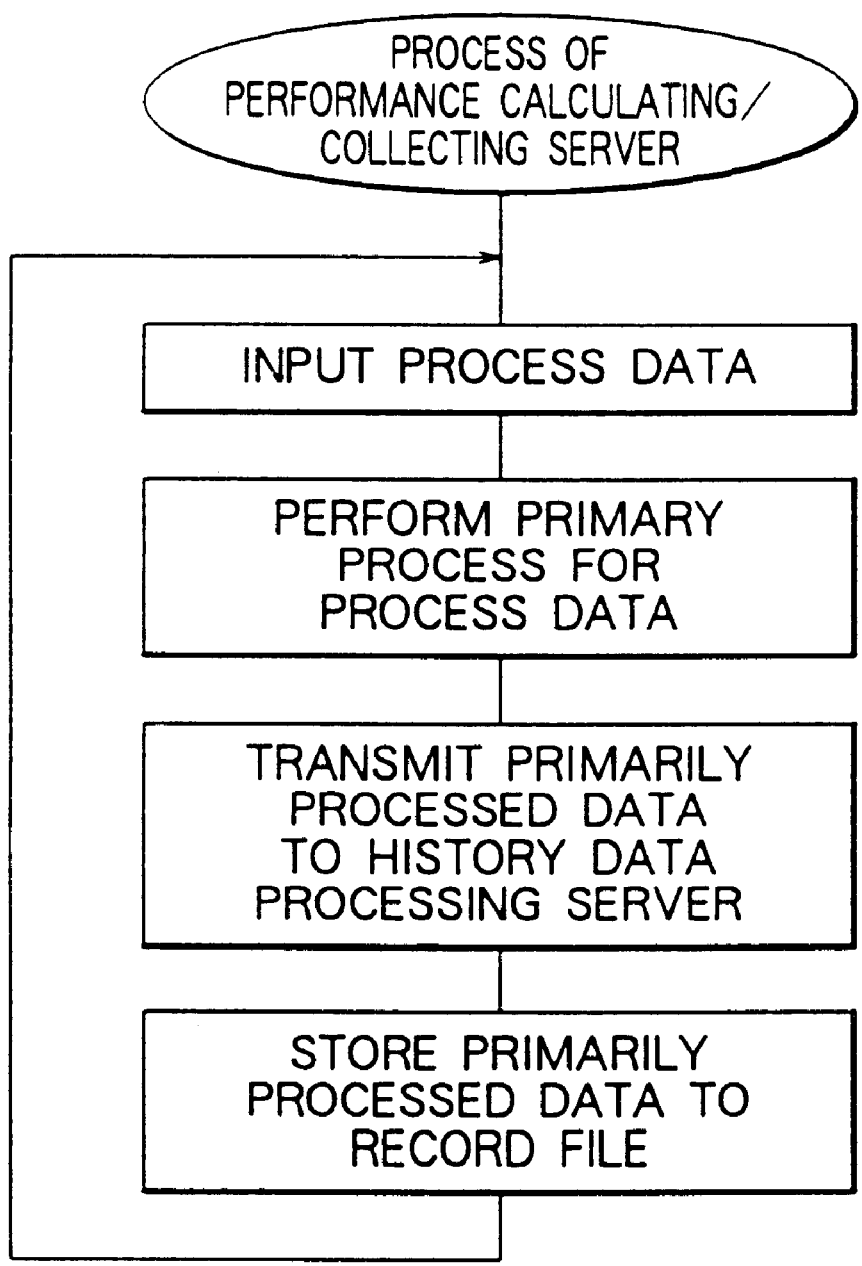
Figure 7B:
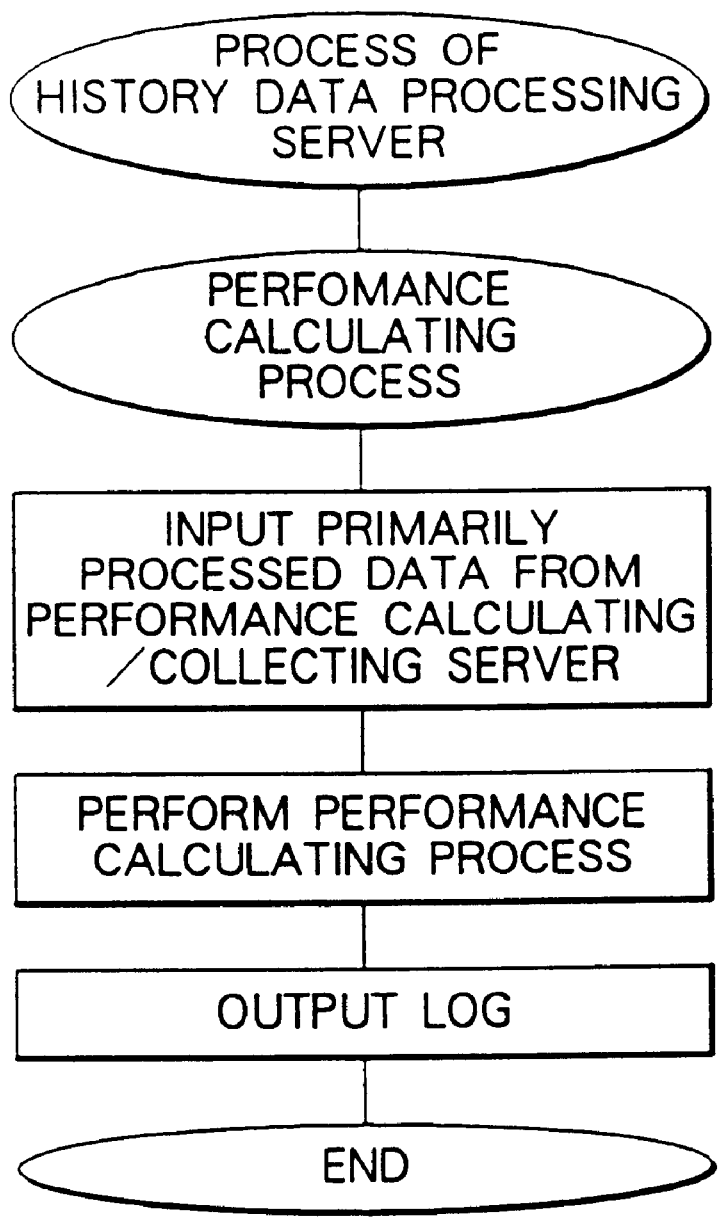
Figure 7D:
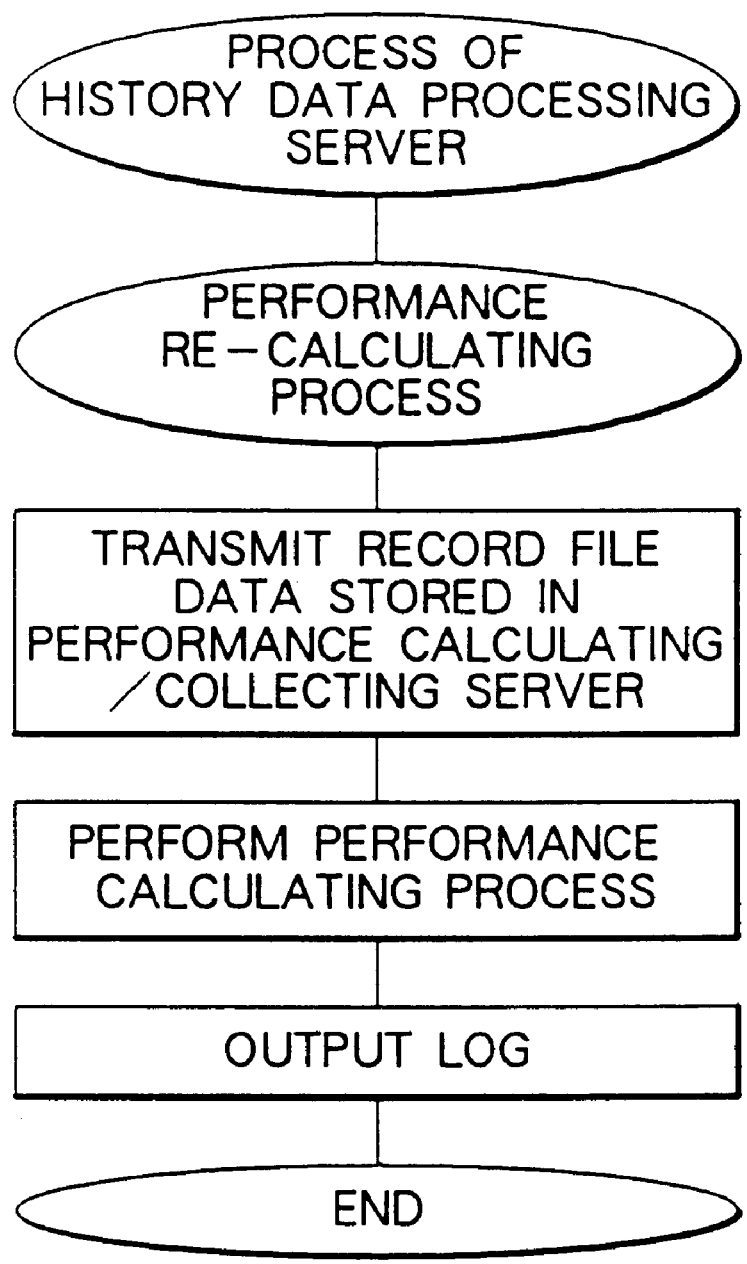

FIG. 4 is a block diagram showing the constitution of a plant supervisory system according to a fourth embodiment of the present invention. FIGS. 5A and 5B are flow charts showing a process of a transition event recording function according to the fourth embodiment of the present invention. FIGS. 6A and 6B are flow charts showing a process of a recorder function according to the fourth embodiment of the present invention. FIGS. 7A to 7D are flow charts showing a process of a performance calculating function according to the fourth embodiment of the present invention.

In the fourth embodiment, a transient data collecting server 10, a recorder data collecting server 11, and a performance calculating/collecting server 12 are connected to a control bus 4 and an information bus 5. The transient data collecting server 10 has a collecting/storing function for transient data of the plant. The performance calculating/collecting server 12 collects data for calculating the performance of the plant. A control unit 1 is connected to the control bus 4. A history data processing server 13 is connected to the information bus 5. The history data processing server 13 has a displaying/printing function for history data. Corresponding to the reliability required for each function, the transient data collecting server 10, the recorder data collecting server 11, and the performance calculating/collecting server 12 are redundantly constituted. On the other hand, the history data processing server 13 that edits, display, and prints data corresponding to the collected data is not redundantly constituted.

The transient event recording function is a function for automatically collecting plant data in the case of an occurrence of a plant event and for printing and displaying the plant data in time series. The transient event recording function is executed by the transient data collecting server 10 and the history data processing server 13 corresponding to the flow charts shown in FIGS. 5A and 5B.

In other words, process data is transmitted from the control unit 1 to the transient data collecting server 10 through the control bus 4 at intervals of a predetermined time period. The transient data collecting server 10 cyclically collects process data of several minutes prior. When a plant event takes place, the transient data collecting server 10 automatically stores the plant event data to a record file. The transient data collecting server 10 determines whether or not a plant event takes place corresponding to process data. The history data processing server 13 inputs a record file stored in the transient data collecting server 10 through the information bus 5 corresponding to an operator's request and prints/displays the record file.

A record file is a large amount of data. The record file is transmitted corresponding to an operator's request. Thus, the record file is transmitted through the information bus 5. Consequently, the record file can be transmitted without varying the transmission amount of the control bus 4 that transmits process data with a relatively constant amount. In addition, since a plant event takes place on an irregular basis, unless the function for collecting transient data always operates, a data drop will take place. Thus, the transient data collecting server 10 is redundantly constituted. Thus, even if one server gets defective, another server can collect and store data. Since the history data processing server 13 performs a process corresponding to data stored in the transient data collecting server 10, even if the history data processing server 13 does not always operate, a data drop does not take place. Thus, since the history data processing server 13 can always operate, it is not necessary to redundantly structure the history data processing server 13.

The recorder function is a function for collecting plant data at intervals of a predetermined time period and printing/displaying the collected data in time series. The recorder function is accomplished by the recorder data collecting server 11 and the history data processing server 13 corresponding to the flow charts shown in FIGS. 6A and 6B.

Process data is transmitted from the control unit 1 to the recorder data collecting server 11 through the control bus 4 at intervals of a predetermined time period. The recorder data collecting server 11 collects process data at intervals of a predetermined time period. When the recorder data collecting server 11 collects process data for a predetermined time period such as one day or one month, it stores the collected process data to a record file. The history data processing server 13 inputs a record file stored in the recorder data collecting server 11 through the information bus 5 corresponding to an operator's request, and prints/displays data.

A record file is a large amount of data and is transmitted corresponding to an operator's request. Thus, the record file is transmitted through the information bus 5. Consequently, the record file can be transmitted without varying the transmission amount of the control bus 4. Unless the recorder data collecting process always operates, a data drop will take place. Thus, the recorder data collecting server 11 is redundantly constituted. Consequently, even if one server gets defectively, another server can collect and store data. On the other hand, the history data processing server 13 performs a process corresponding to data stored in the recorder data collecting server 11. Even if the history data processing server 13 does not always operate, a data drop will not take place. Since the history data processing server 13 can operate anytime, it is not necessary to redundantly structure the server 13.

The performance calculating function is a function for collecting plant data at intervals of a predetermined period, performing a performance calculating process for a plant state corresponding to the collected data, and outputting a log of an operation state of the plant. The performance calculating function is accomplished by the performance calculating/collecting server 12 and the history data processing server 13 corresponding to the flow charts shown in FIGS. 7A to 7D.

Process data is transmitted from the control unit 1 to the performance calculating/collecting server 12 through the control bus 4 at intervals of a predetermined time period. The performance calculating/collecting server 12 collects process data at intervals of a predetermined time period, performs a primary process such as an average value calculation, stores the processed data to a record file, and transmits the record file to the history data processing server 13 through the information bus 5. The history data processing server 13 performs a performance calculating process corresponding to the primarily processed data and outputs a log of an operation state of the plant. The history data processing server 13 also performs a calculating process corresponding to an operator's request. Data for the calculating process is input as a record file that is stored in the performance calculating/collecting server 12 through the information bus 5.

A record file is a large amount of data and is transmitted corresponding to an operator's request. Thus, the record file is transmitted through the information bus 5. Consequently, the record file can be transmitted without varying the transmission amount of the control bus 4. Unless the collecting process always operates, a data drop will take place. Thus, the performance calculating/collecting server 12 is redundantly constituted. Thus, even if a server gets defective, another server can collect and store data. On the other hand, in the performance calculating process of the history data processing server 13, with data of a record file stored in the performance calculating/collecting server 12, a recalculation can be performed. Thus, even if history data processing server 13 does not always operate, a data drop will not take place. Thus, it is not necessary to redundantly structure the history data processing server 13.

In the fourth embodiment, servers are dedicated to different functions. However, a plurality of functional servers may be integrated.

As described above, according to the fourth embodiment, although the transmission amount of output data of a functional server varies corresponding to an operator's request, the output data of the functional server is transmitted through the information bus 5. Thus, in the control bus 4 that transmits process data with a relatively constant amount at intervals of a predetermined time period, since the transmission amount does not increase, a delay does not take place. Consequently, the latest process data can be supervised. In addition, when only functional servers that require reliability are redundantly constituted, the hardware scale of the system does not increase. Thus, unnecessary constitution and controlling operations are omitted. Consequently, a plant supervisory system with high reliability can be provided at low cost.

(Fifth Embodiment)

Figure 8:
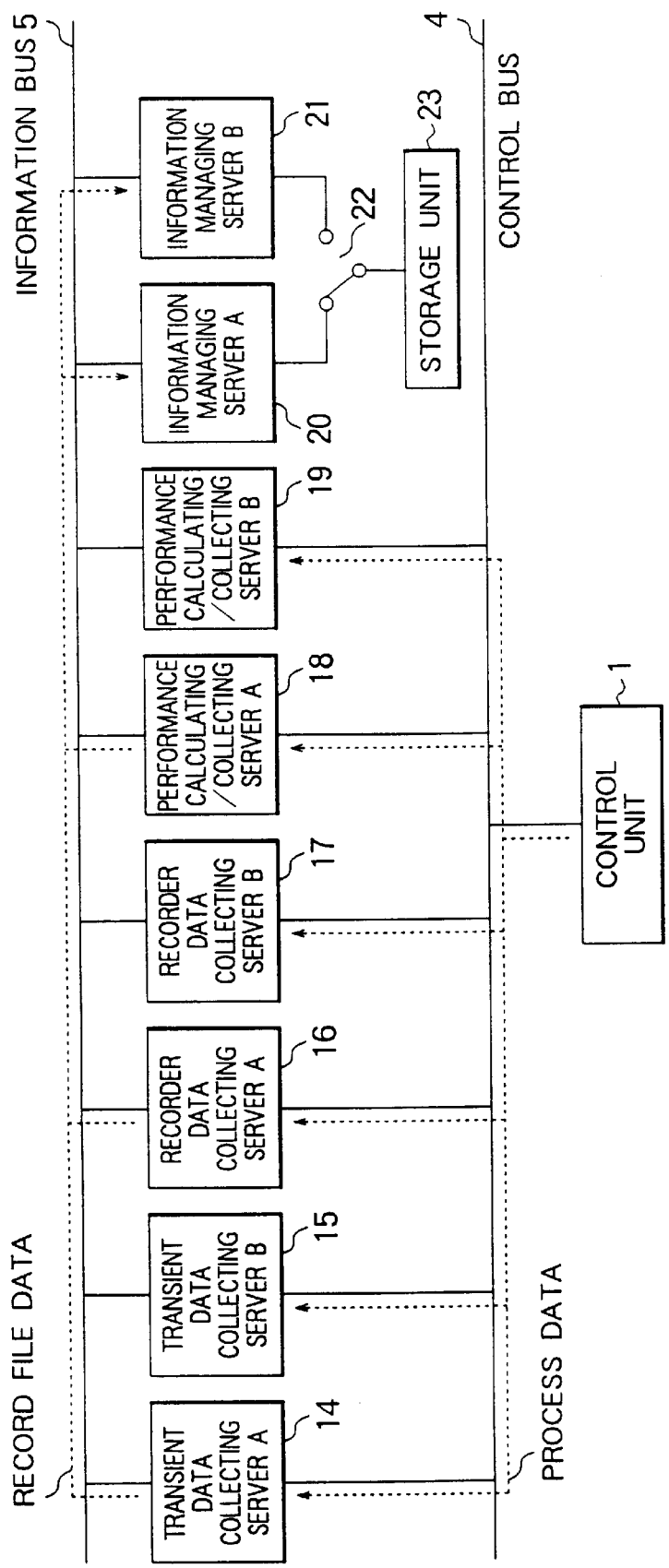
FIG. 8 is a block diagram showing the constitution of a plant supervisory system according to a fifth embodiment of the present invention.
Figure 9A:
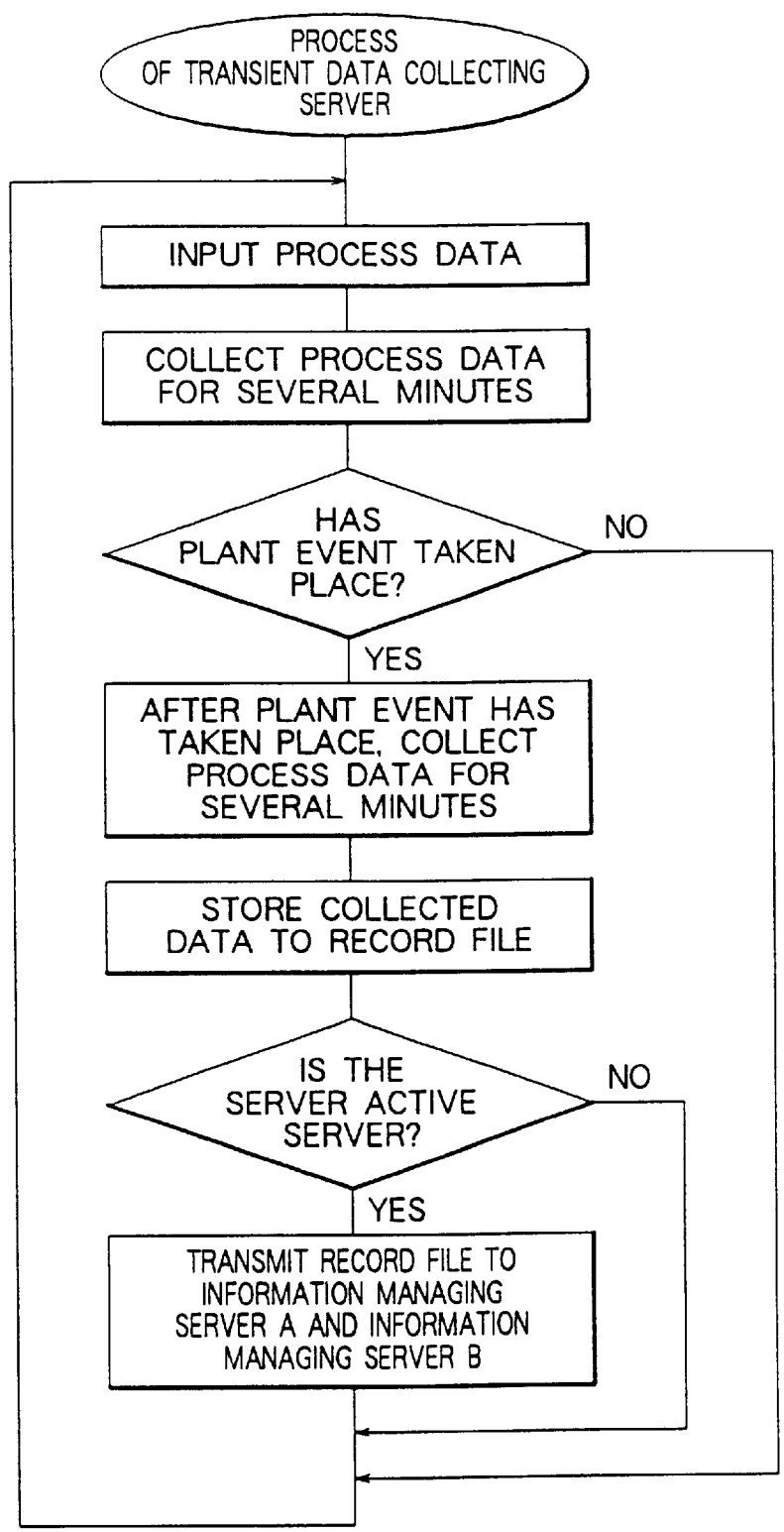
FIG. 9A, FIG. 9B, FIG. 9C and FIG. 9D are flow charts showing processes of a transient data collecting server, a recorder data collecting server, a performance calculating/collecting server, and an information managing server according to the fifth embodiment of the present invention.
Figure 9B:
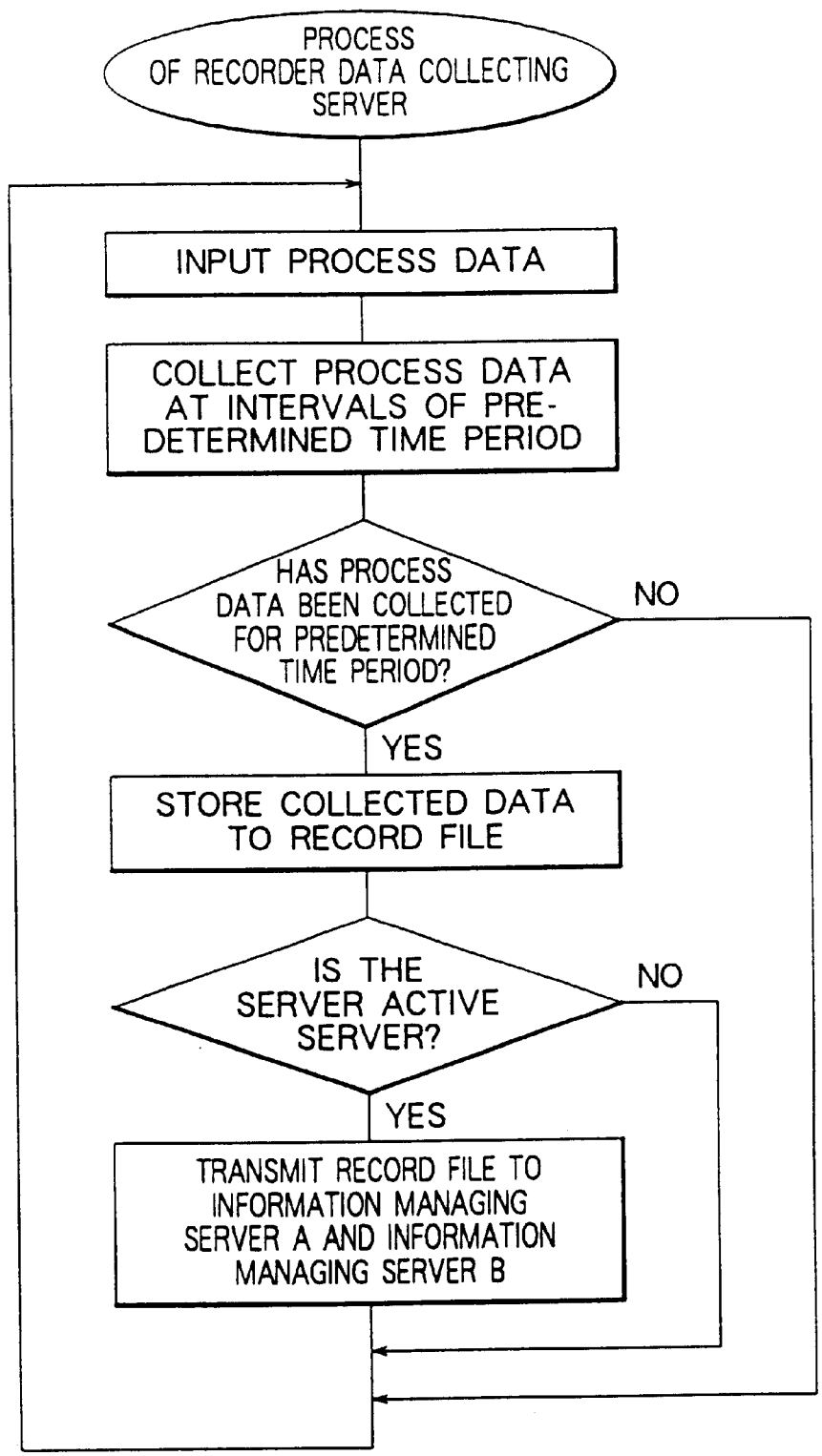
Figure 9C:
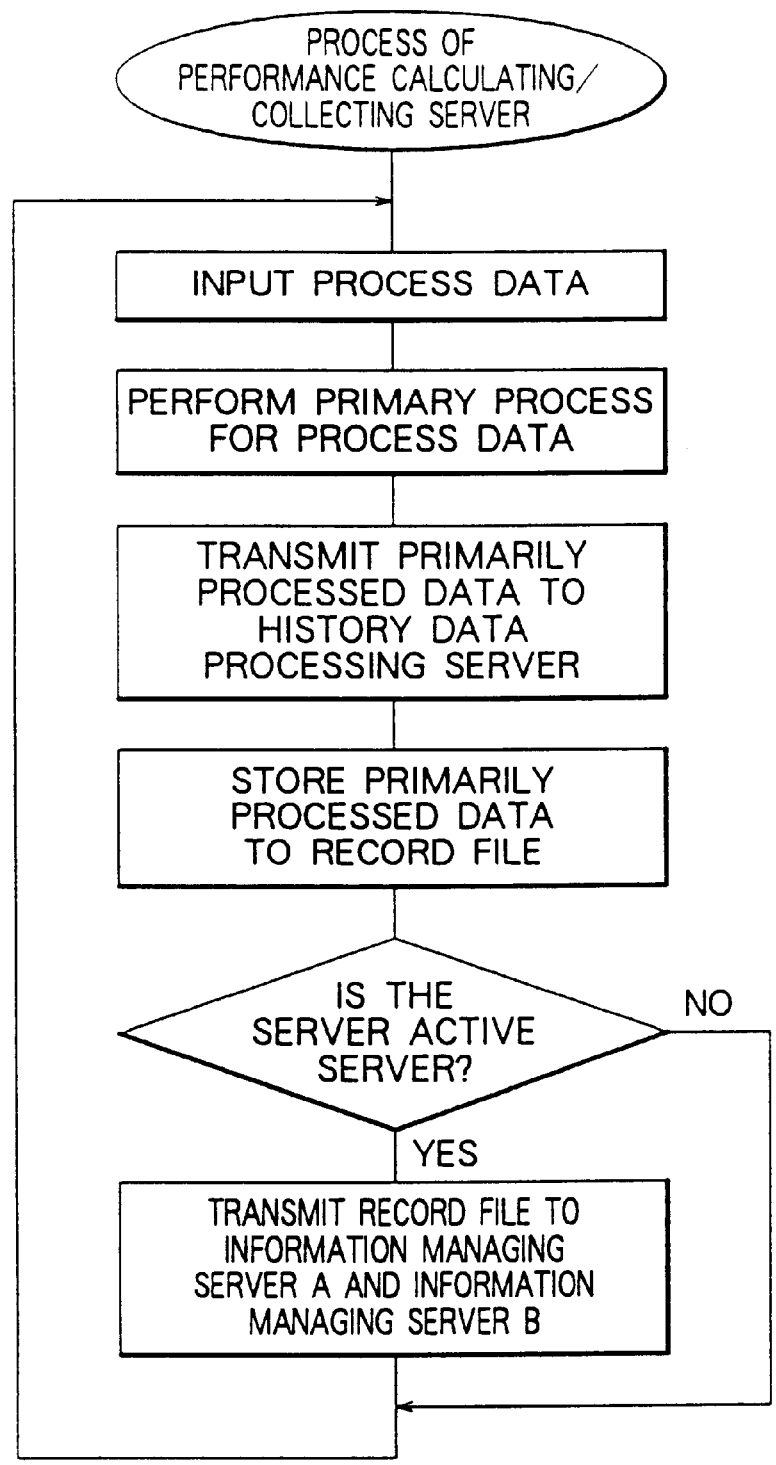
Figure 9D:
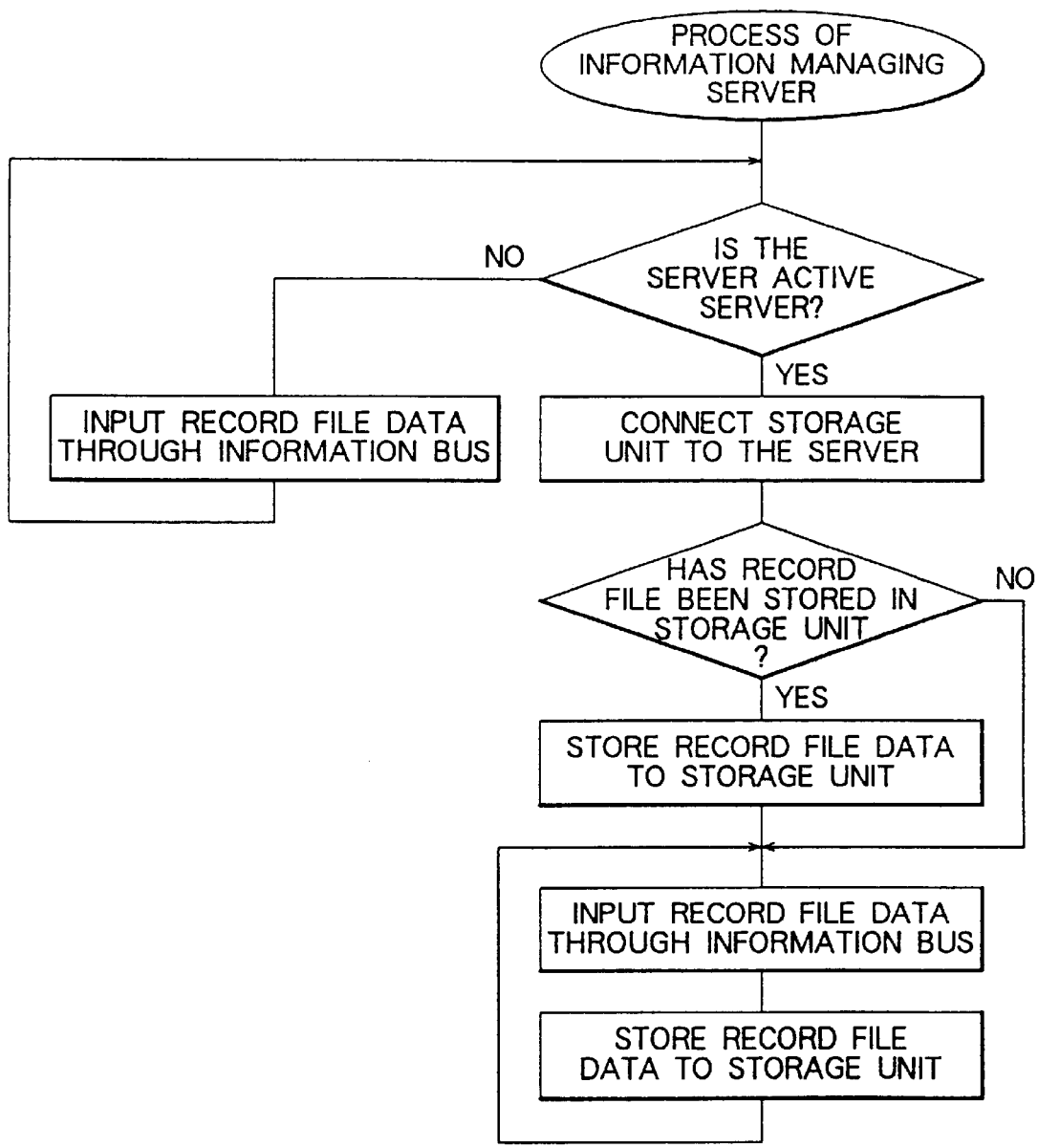

FIG. 8 is a block diagram showing a plant supervisory system according to a fifth embodiment of the present invention. FIGS. 9A to 9D are flow charts showing processes of a transient data collecting server, a recorder data collecting server, a performance calculating/collecting server, and an information managing server according to the fifth embodiment of the present invention.

In the fifth embodiment, transient data collecting servers A 14 and B 15, recorder data collecting servers A 16 and B 17, and performance calculating/collecting servers A 18 and B 19 are connected to a control bus 4 and a information bus 5. A control unit 1 is connected to the control bus 4. Information managing servers A 20 and B 21 are connected to the information bus 5. In these servers, servers A represent active servers. Servers B represent backup servers.

The control unit 1 transmits process data to the transient data collecting server A 14, B 15, the recorder data collecting server A 16, B 17, the performance calculating/collecting server A 18, and B 19 through the control bus 4. Each of the active servers inputs process data from the control unit 1, performs a collecting process, stores the result to a record file, and transmits the record file data to the information managing server A 20 and B 21 through the information bus 5. Each of the standby servers inputs process data from the control unit 1, performs a collecting process, and stores the data to a record file (but does not transmit the record file data to the information managing servers).

Either the information managing server A 20 or B 21 is connected to a storage unit 23 through a switch 22. In normal state, the storage unit 23 is connected to the information managing server A 20 on the active side. The information managing server A 20 stores the received record file data to the storage unit 23. The information managing server B 21 on backup side stores only the latest data of the record file data and discards old record file data.

When the information managing server A 20 on active side stops, the information managing server B 21 on backup side becomes an active server. At this point, the information managing server B 21 is connected to the storage unit 23. The information managing server that has become the active server determines whether the latest record file data of the information managing server B 21 has been stored in the storage unit 23 corresponding to a time stamp of the data. When the latest record file data has been stored in the storage unit 23, since the latest record file data of the information managing server A 20 has been stored, it discards the latest record file data. When the storage unit 23 has not stored the latest record file data of the information managing server, since the current backup server has stopped before the record file data has been stored, the information managing server B 21 stores the latest record file data to the storage unit 23.

The storage unit 23 is a unit that is redundantly constituted (for example, the storage unit 23 is duplexed). Thus, record file data that has been collected can be stored to the storage unit 23 that has high reliability. However, it is not necessary to redundantly structure the storage unit of each of the transient data collecting server, the recorder data collecting server, and the performance calculating/collecting server.

As described above, according to the fifth embodiment of the present invention, the storage unit of the information managing server is structured with high reliability. Record file data is transmitted/stored through the information bus 5. Thus, the storage unit of each of other functional servers can be simply structured. Consequently, a plant supervisory system with high reliability and easy maintainability can be provided at relatively low cost.

In addition, since record file data of a functional server has a large transmission amount and is transmitted in a long time period, the record file data is transmitted through the information bus 5. Thus, the control bus 4 can transmit process data having a relatively constant amount without a delay. Consequently, the latest process data can be supervised.

(Sixth Embodiment)

Figure 10:
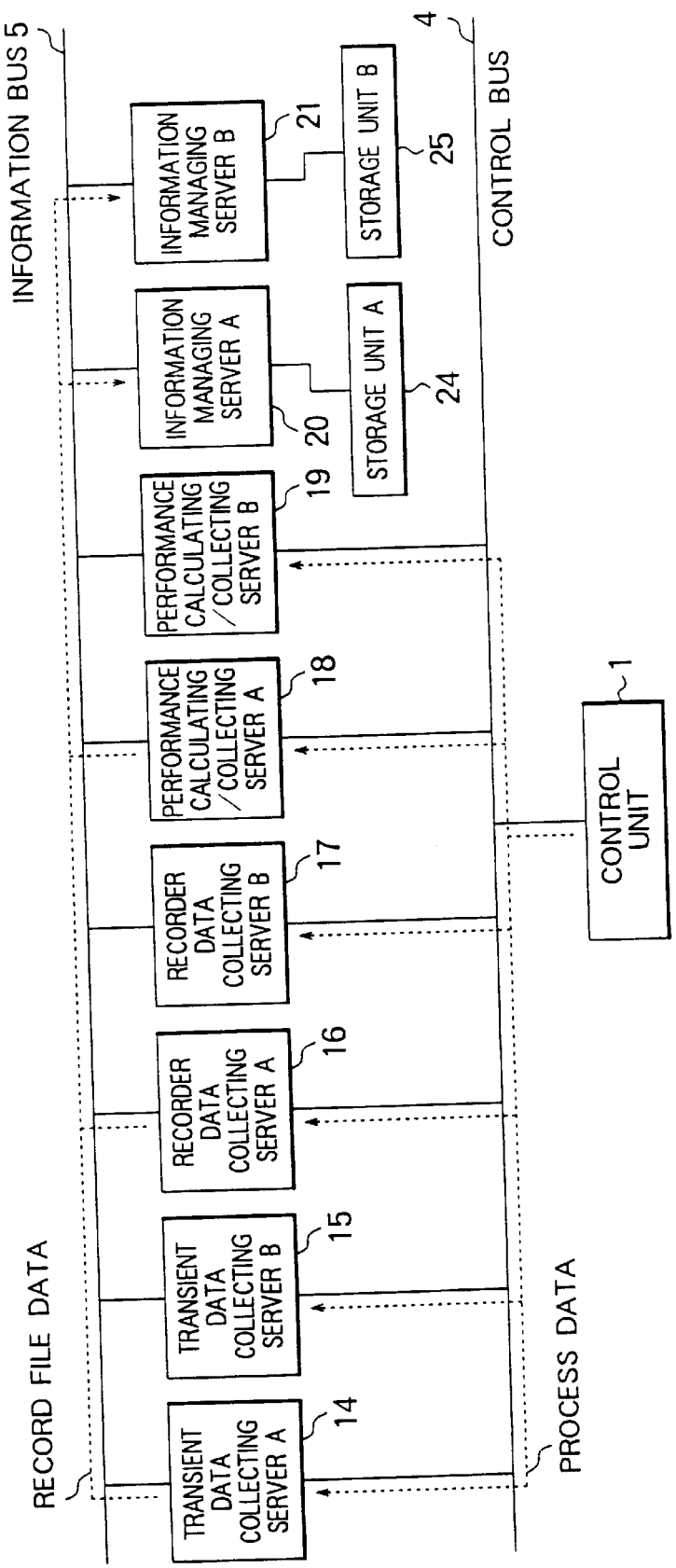
FIG. 10 is a block diagram showing the constitution of a plant supervisory system according to a sixth embodiment of the present invention.
Figure 11A:
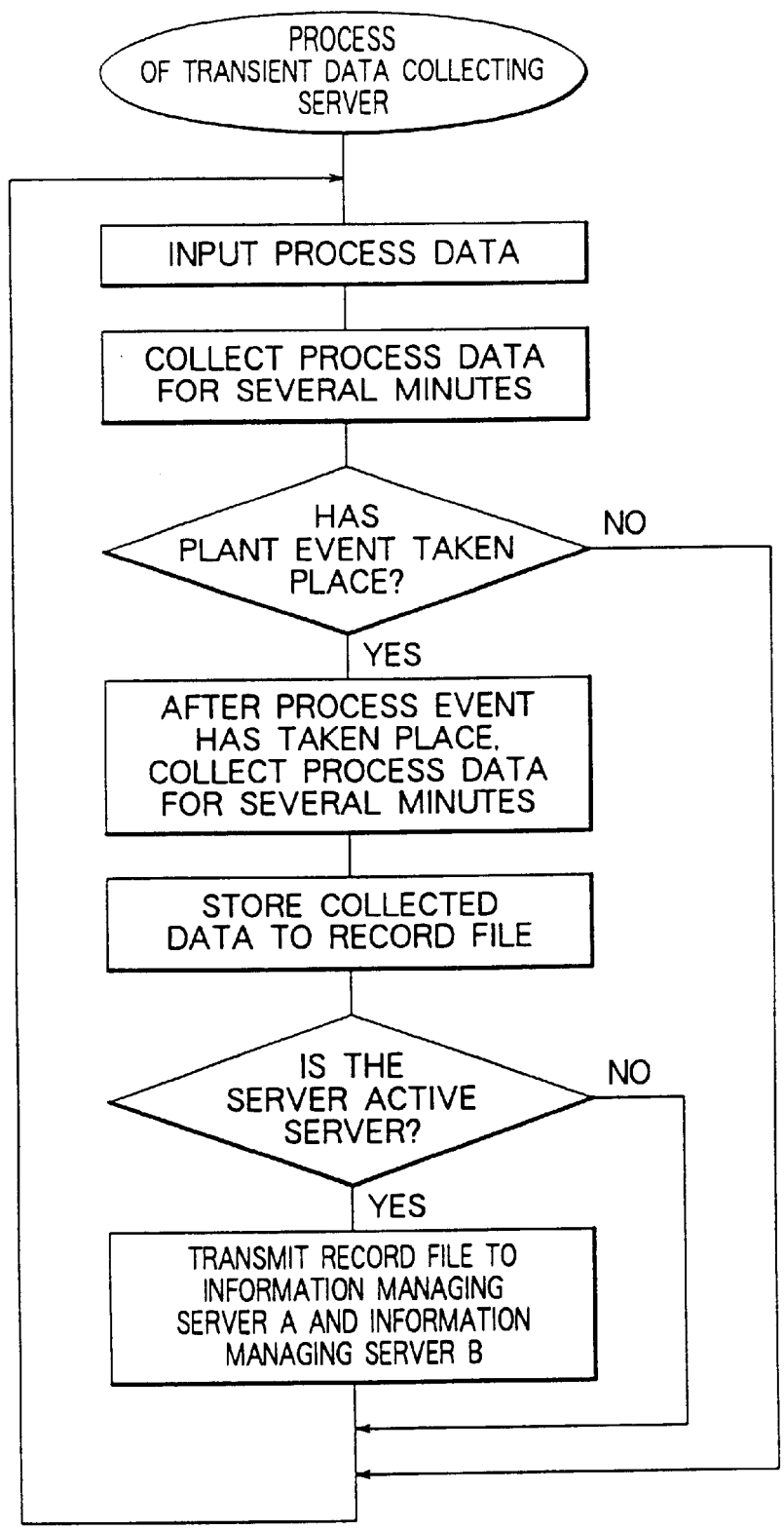
FIG. 11A, FIG. 11B, FIG. 11C and FIG. 11D are flow charts showing processes of a transient data collecting server, a recorder data collecting server, a performance calculating/collecting server, and an information managing server according to the sixth embodiment of the present invention.
Figure 11B:
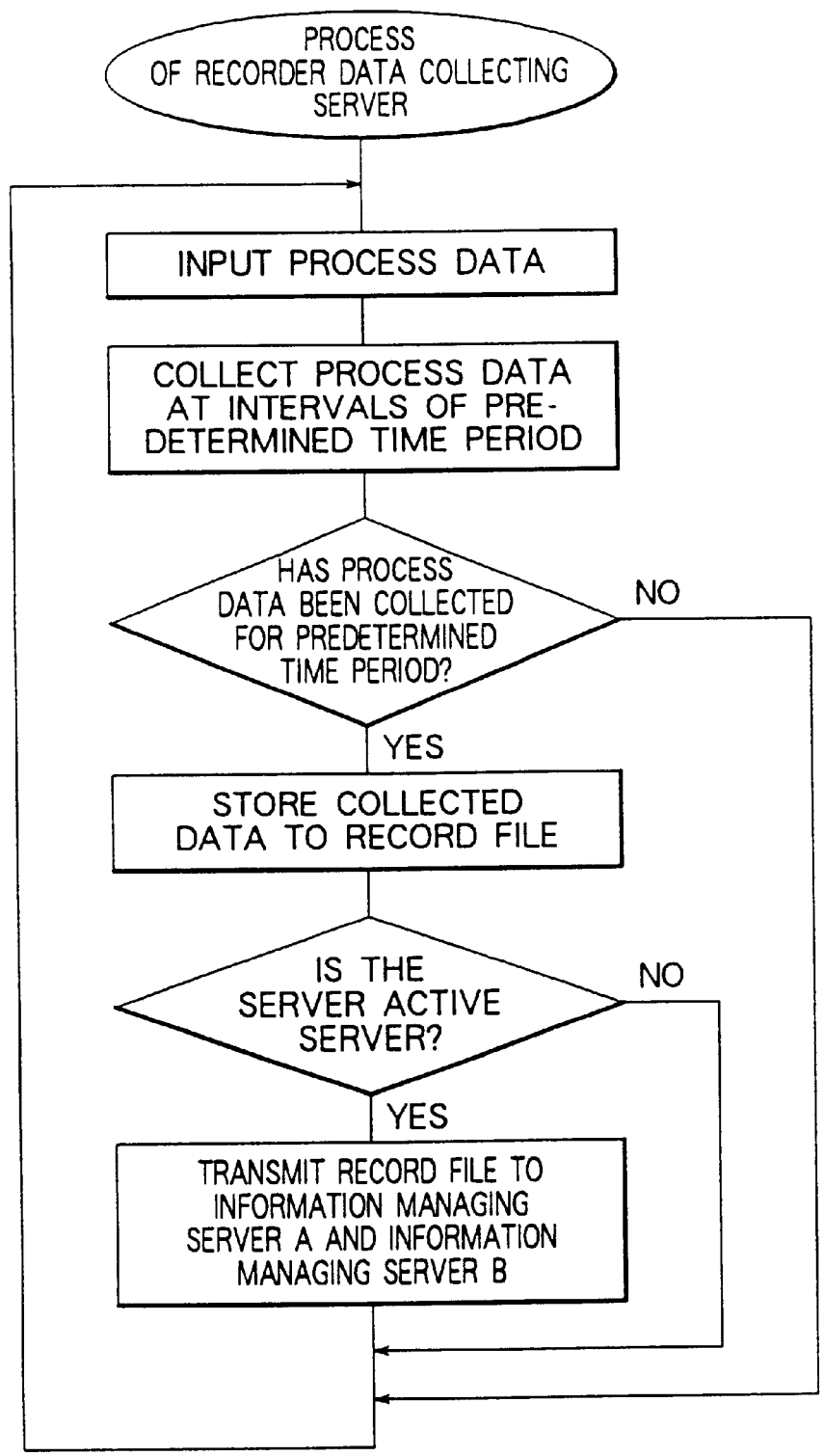
Figure 11C:
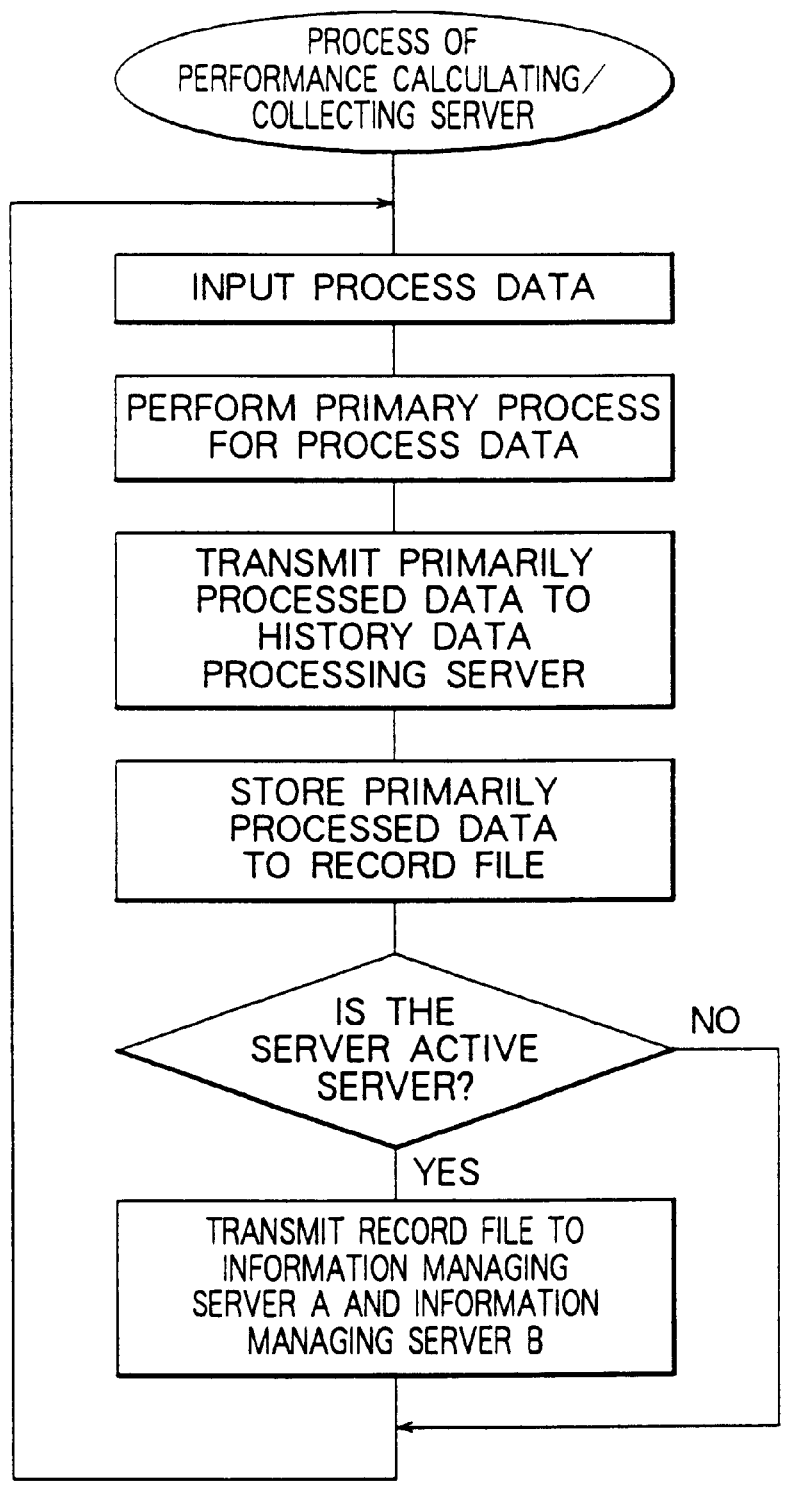
Figure 11D:
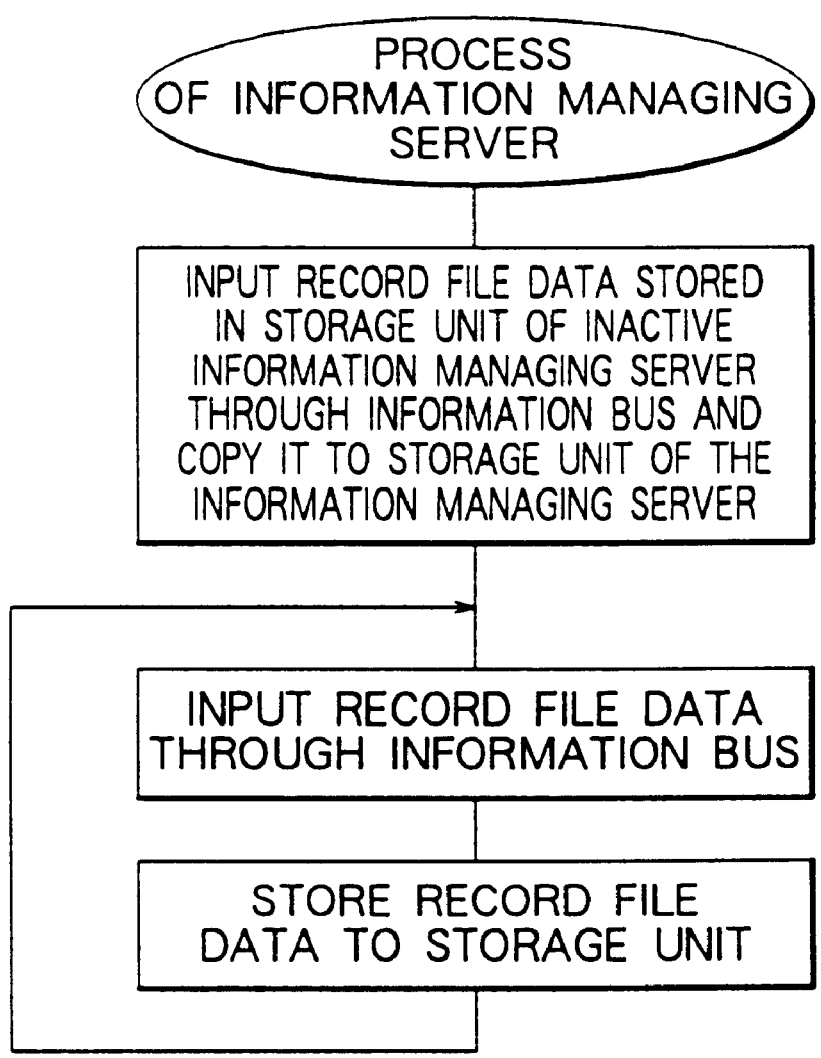

FIG. 10 is a block diagram showing the constitution of a plant supervisory system according to a sixth embodiment of the present invention. FIGS. 11A to 11D are flow charts showing processes of a transient data collecting server, a recorder data collecting server, a performance calculating/collecting server, and an information managing server.

In the sixth embodiment of the present invention, a storage unit A 24 is connected to an information managing server A 20 on active side. A storage unit B 25 is connected to an information managing server B 21 on backup side. Record file data is stored to the storage units A 24 and B 25 connected to the information managing servers A 20 and B 21, respectively. The other constitution of the sixth embodiment is the same as that of the fifth embodiment.

If an information managing server stops, to prevent record file data from dropping, when the server starts, record file data of a storage unit of the defective information managing server is input through the information bus 5. The old record file data is copied to the storage unit connected to the server. Thus, even if one information managing server gets defective, the data stored in the storage unit A 24 is the same as the data stored in the storage unit B 25. Thus, the record file data can be stored without a data drop.

As described above, according to the sixth embodiment, the storage units of the information managing servers are structured with high reliability. Record file data is transmitted through the control bus 4. Thus, the number of storage units used in a plurality of functional servers can be minimized. Consequently, a plant supervisory system with high reliability and easy maintainability can be provided at relatively low cost. Since record file data that has a large transmission amount and that requires a large transmission period is transmitted from a functional server through the information bus 5, the control bus 4 can transmit process data without a delay. As a result, the latest process data can be supervised.

(Seventh Embodiment)

Figure 12:
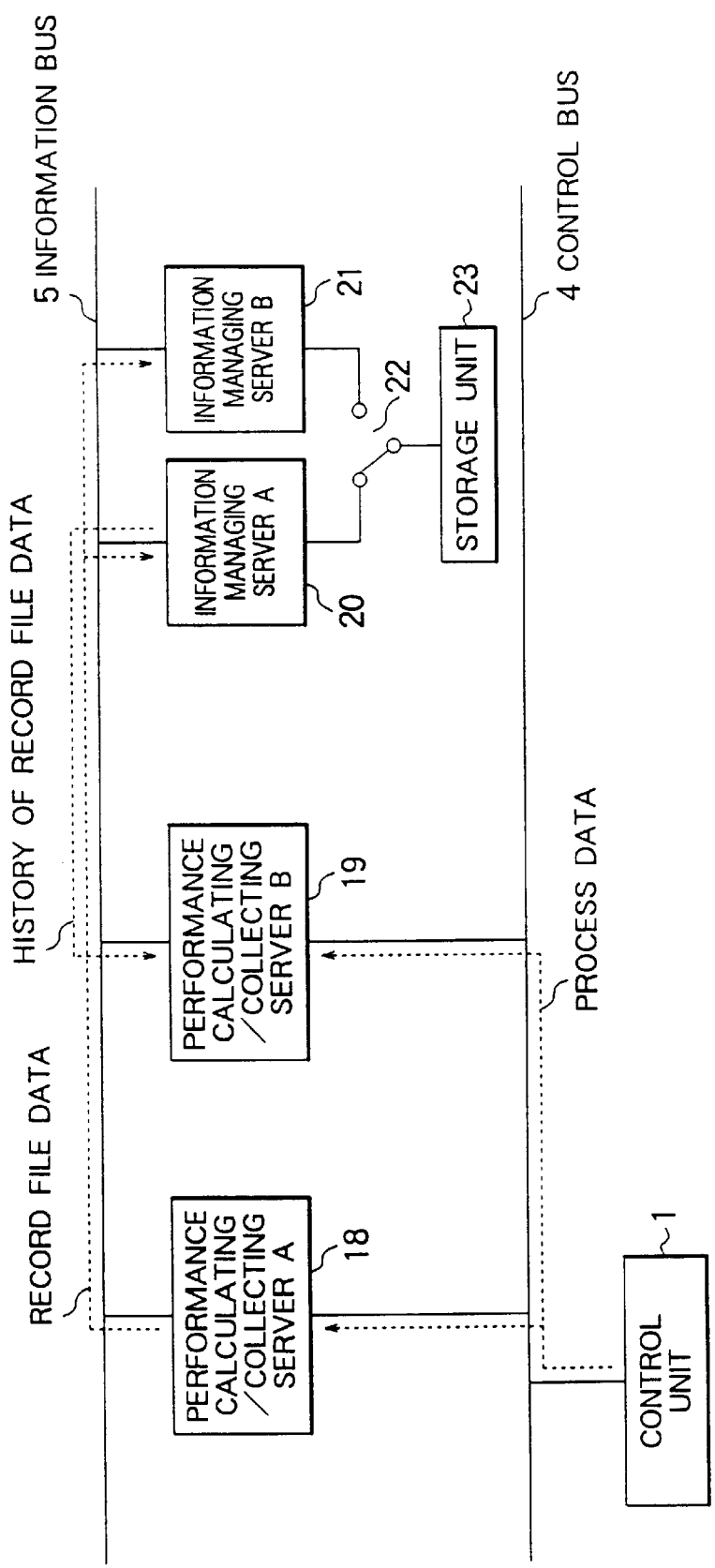
FIG. 12 is a block diagram showing the constitution of a plant supervisory system according to a seventh embodiment of the present invention.
Figure 13A:
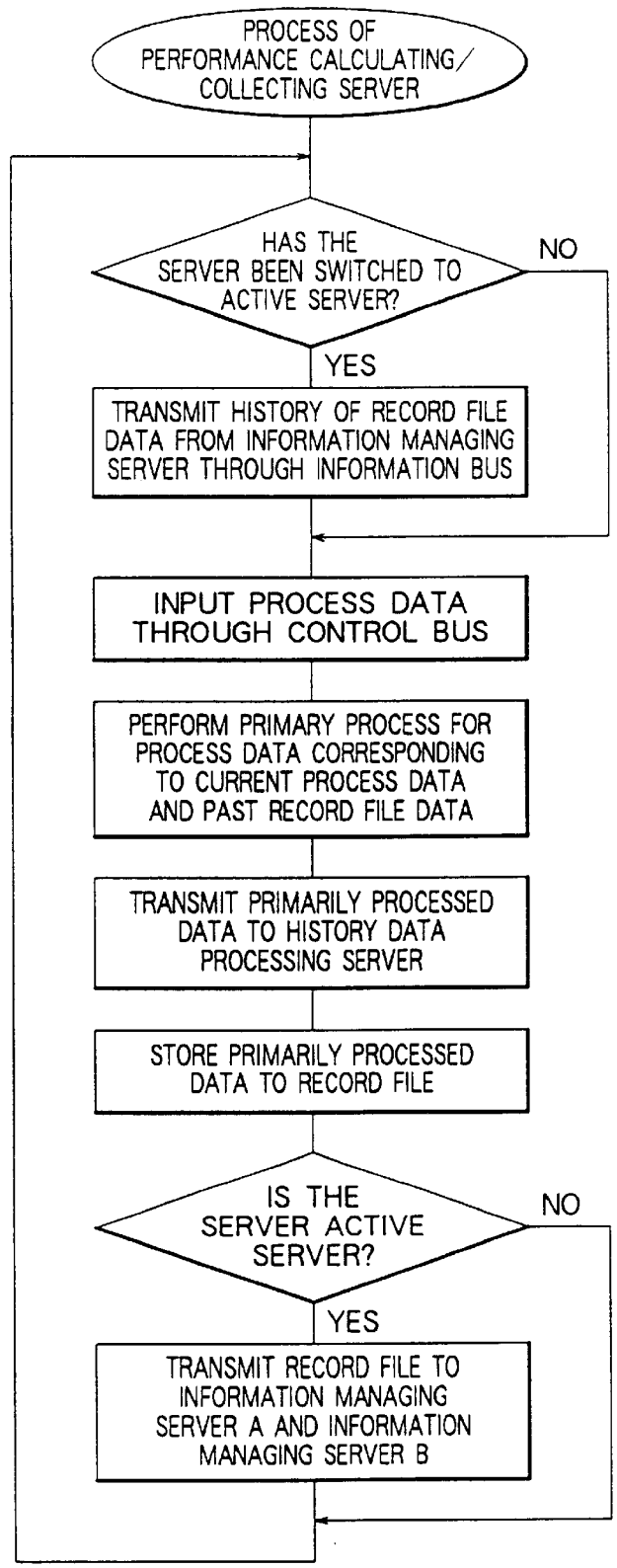
FIG. 13A and FIG. 13B are flow charts showing processes of a performance calculating/collecting server and an information managing server according to the seventh embodiment of the present invention.
Figure 13B:
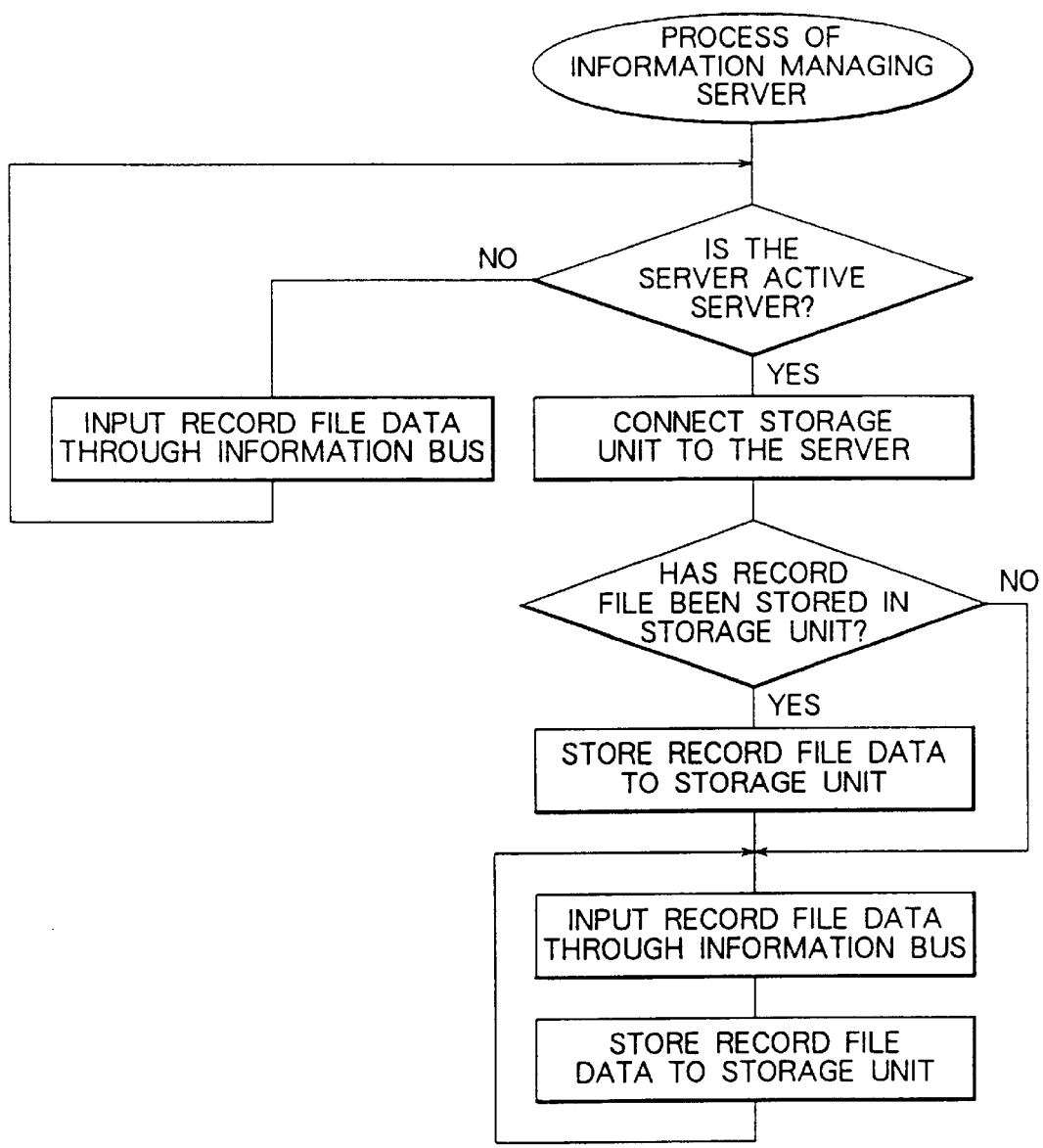

FIG. 12 is a block diagram showing the constitution of a plant supervisory system according to a seventh embodiment of the present invention. FIGS. 13A and 13B are flow charts showing processes of a performance calculating/collecting server and an information managing server according to the seventh embodiment of the present invention.

In the seventh embodiment, a performance calculating/collecting server A 18 and B 19 are connected to a control bus 4 and an information bus 5. A control unit 1 is connected to the control bus 4. An information managing server A 20 and B 21 are connected to the information bus 5.

The control unit 1 transmits process data to the performance calculating/collecting server A 18 and B 19 through the control bus 4. The performance calculating/collecting server A 18 and B 19 are duplexed. The performance calculating/collecting server A 18 a normally active server. The performance calculating/collecting server B 19 is a backup server. The active performance calculating/collecting server A 18 transmits a message to the inactive performance calculating/collecting server B 19 so as to inform it that the performance calculating/collecting server A 18 is normally operating.

The active performance calculating/collecting server A 18 performs a calculating process for input process data, stores the processed result to a record file, and transmits the record file data to the information managing server A 20 and B 21 through the information bus 5. The backup performance calculating/collecting server B 19 performs a calculating process for input process data and stores the calculated result to a record file (but, does not transmit the record file data to the information managing servers).

A switch 22 is connected to either the information managing server A 20 or B 21. In normal state, a storage unit 23 is connected to the information managing server A 20 on active side. Record file data transmitted to the active server is stored to the storage unit 23. The backup information managing server B 21 stores only the latest data of the received record file data and discards the old record file data.

When the information managing server A 20 on active side stops, the other information managing server B 21 becomes an active server. At this point, the information managing server B 21 is connected to the storage unit 23. After the information managing server that has become an active server has been connected to the storage unit 23, this information managing server determines whether or not the latest record file data of the server on backup side has been stored in the storage unit 23 corresponding to a time stamp of the data. When the storage unit 23 has stored the latest record file data of the server, since the latest record file data of the server side has been stored, the information managing server discards the latest record file data. When the storage unit 23 has not stored the latest record file of the server, since the former active performance calculating/collecting server has stopped before the latest record file data has been stored, the latest record file data of the server on backup side is stored to the storage unit 23.

When the normally active performance calculating/collecting server A 18 gets defective, since the inactive performance calculating/collecting server B 19 cannot receive the normal message from the performance calculating/collecting server A 18, the performance calculating/collecting server B 19 determines that the performance calculating/collecting server A 18 gets defective. Thus, the backup performance calculating/collecting server B 19 becomes an active server.

As a primary process for process data, since a cumulating process for process data is performed, old record data of the performance calculating/collecting server A 18 is required. Thus, the performance calculating/collecting server B 19 causes the information stored in the performance calculating/collecting server A 18 to be transmitted to the performance calculating/collecting server B 19 through the information bus 5. The performance calculating/collecting server B 19 takes over the process of the performance calculating/collecting server A 18 with the received data.

As described above, according to the seventh embodiment of the present invention, even if one functional server gets defective, another functional server takes over data of the defective functional server. Thus, the function can be successively performed. In addition, record file data that has a large transmission amount and requires a long transmission period is transmitted from a performance calculating/collecting server through the information bus 5. Consequently, the control bus 4 can transmit process data having a relatively constant amount without a delay. Thus, the latest process data can be supervised.

(Eighth Embodiment)

Figure 14:
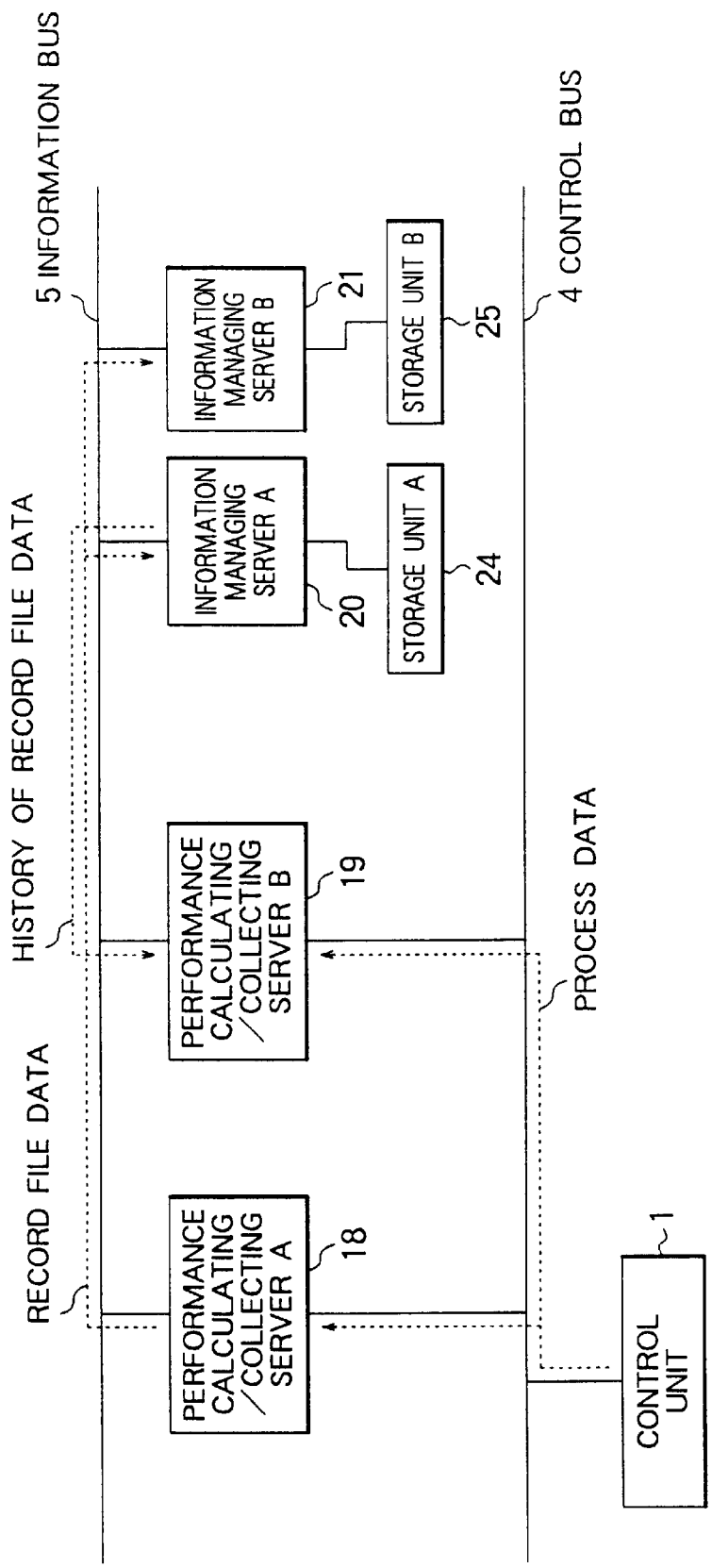
FIG. 14 is a block diagram showing the constitution of a plant supervisory system according to an eighth embodiment of the present invention.
Figure 15A:
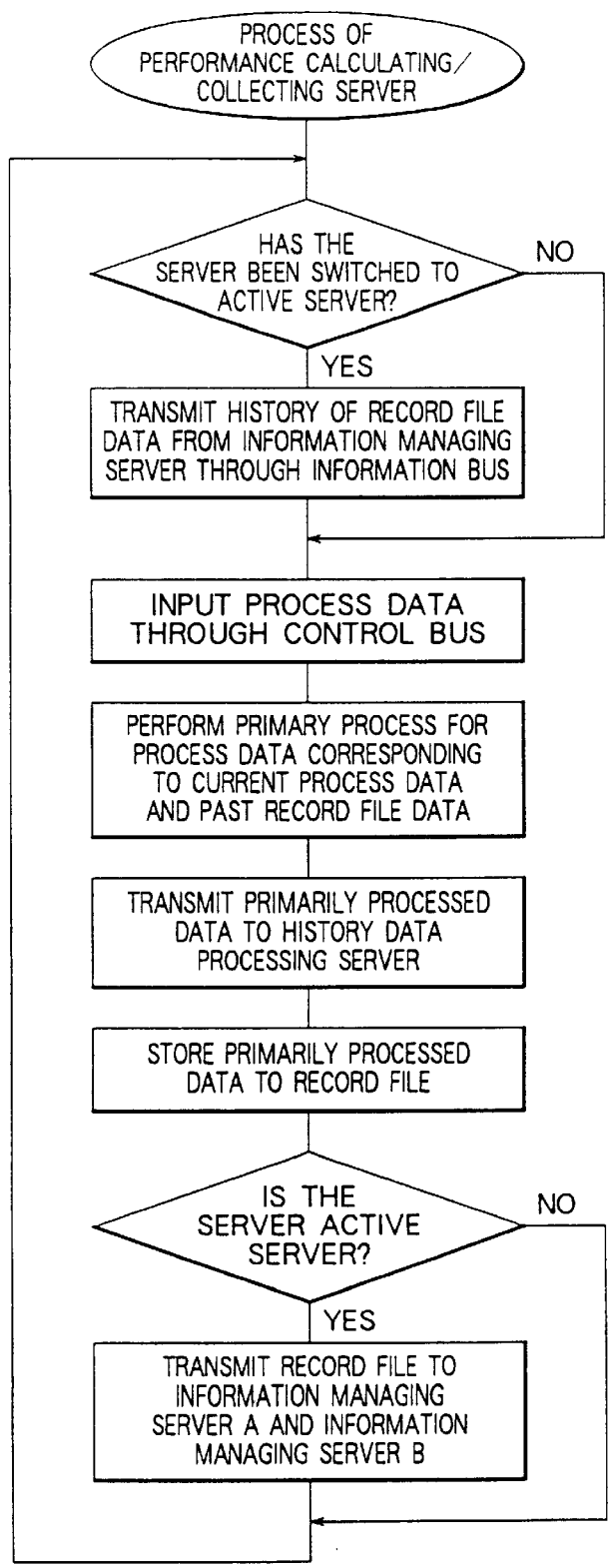
FIG. 15A and FIG. 15B are flow charts showing processes of a performance calculating/collecting server and an information managing server according to the eighth embodiment of the present invention.
Figure 15B:
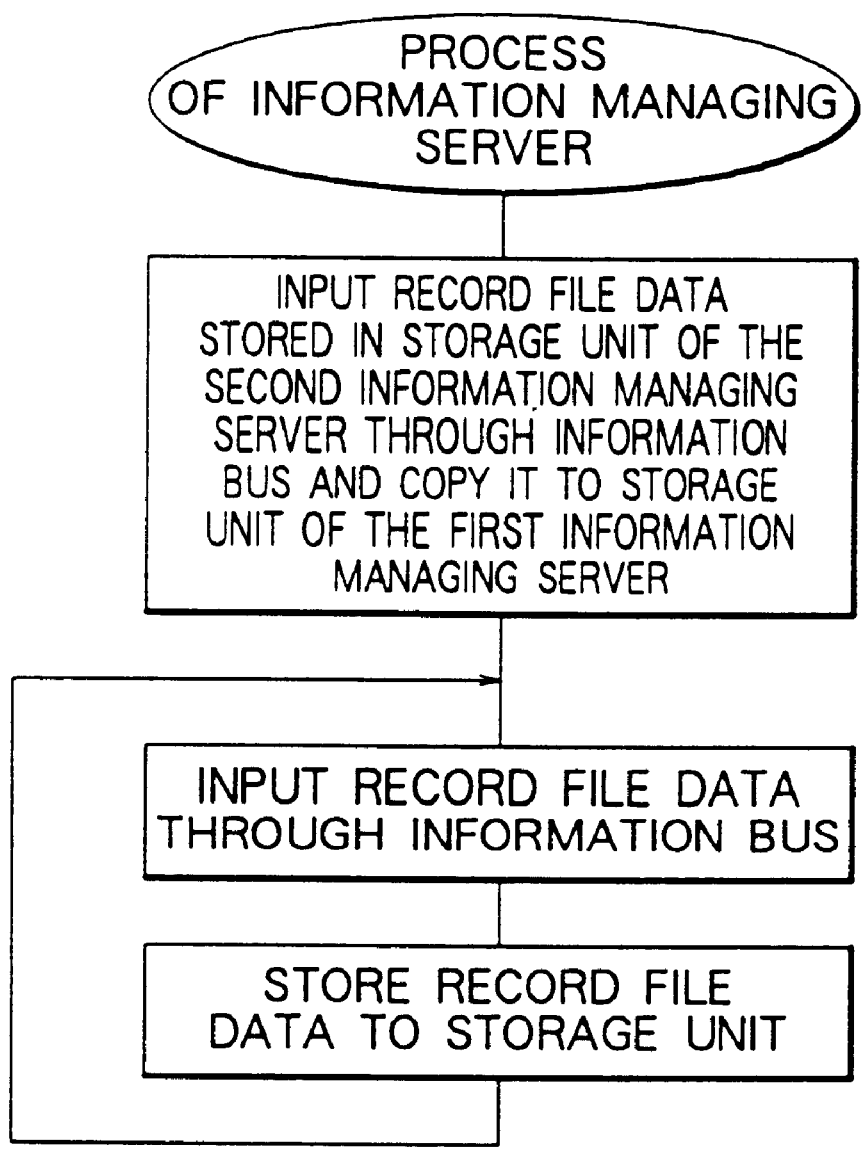

FIG. 14 is a block diagram showing the constitution of a plant supervisory system according to an eighth embodiment of the present invention. FIGS. 15A and 15B are flow charts showing processes of a performance calculating/collecting server and an information managing server according to the eighth embodiment of the present invention.

In the eighth embodiment, a storage unit A 24 is connected to a normally active information managing server A 20. A storage unit B 25 is connected to a standby information managing server B 21. The storage units A24 and B25 connected to the information managing servers A20 and B21 store record file data. The other constitution of the eighth embodiment is the same as that of the seventh embodiment.

If an information managing server stops, to prevent record file data from dropping, when the server starts, record file data of a storage unit of the defective information managing server is input through the information bus 5. The old record file data is copied to the storage unit connected to the server. Thus, even if one information managing server gets defective, the data stored in the storage unit A 24 is the same as the data stored in the storage unit B 25. Thus, the record file data can be stored without a data drop.

As described above, according to the eighth embodiment of the present invention, even if one functional server gets defective, another functional server takes over data of the defective functional server. Thus, the function can be successively performed. In addition, record file data that has a large transmission amount and requires a long transmission period is transmitted from a performance calculating/collecting server through the information bus 5. Consequently, the control bus 4 can transmit process data having a relatively constant amount without a delay. Thus, the latest process data can be supervised.

(Ninth Embodiment)

Figure 16:
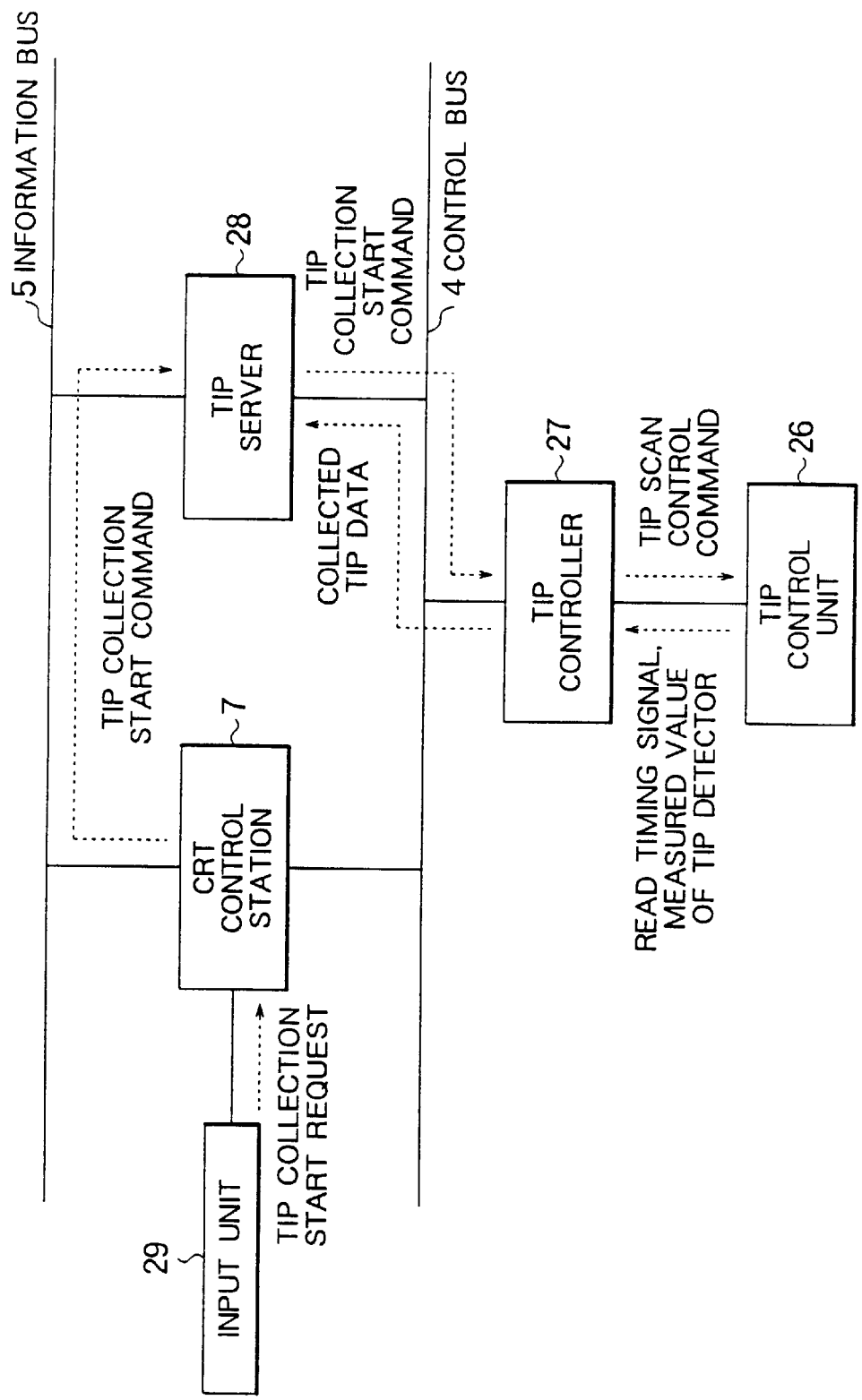
FIG. 16 is a block diagram showing the constitution of a plant supervisory system according to a ninth embodiment of the present invention.
Figure 17:
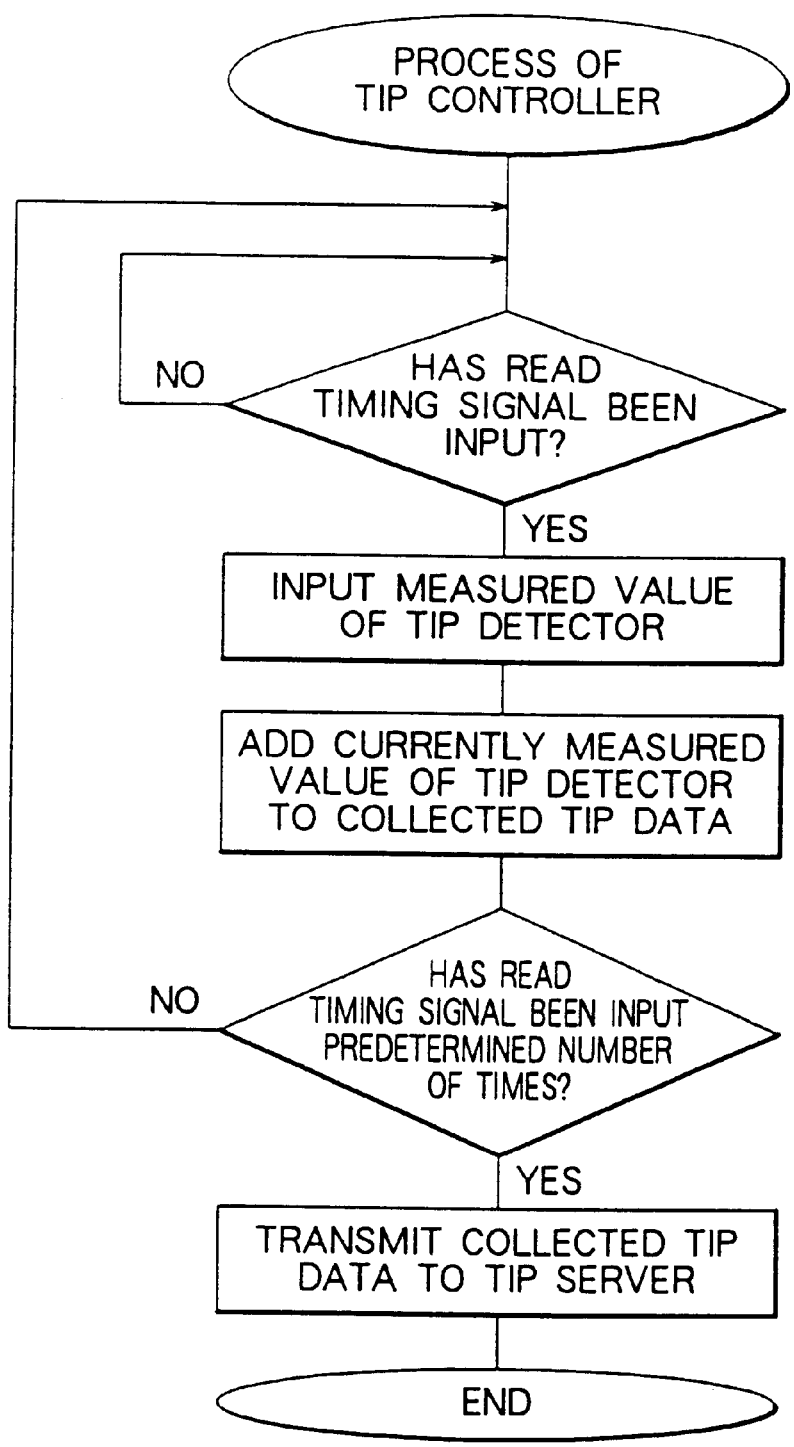
FIG. 17 is a flow chart showing a process of a TIP controller according to the ninth embodiment of the present invention.

FIG. 16 is a block diagram showing the constitution of a plant supervisory system according to a ninth embodiment of the present invention. FIG. 17 is a flow chart showing a process of a TIP controller according to the ninth embodiment of the present invention.

The plant supervisory system according to the ninth embodiment comprises a TIP control unit 26, a TIP controller 27, a TIP server 28, a CRT control station 7, and a input unit 29. The TIP control unit 26 controls a TIP detector of a nuclear power plant. The TIP controller 27 collects high speed periodic data that is output from the TIP control unit 26. The TIP server 28 is connected to the TIP controller 27 through a control bus 4. The CRT control station 7 is connected to the control bus 4 and an information bus 5. The input unit 29 is connected to the CRT control station 7.

Next, the operation of the plant supervisory system according to the ninth embodiment of the present invention will be described.

The CRT control station 7 receives a TIP data collection start request from the input unit 29 and outputs a TIP collection start command to the TIP server 28 through the information bus 5. When the TIP server 28 receives the TIP collection start command from the CRT control station 7, the TIP server 28 outputs the TIP collection start command to the TIP controller 27 through the control bus 4. When the TIP controller 27 receives the TIP collection start command from the TIP server 28, the TIP controller 27 outputs the TIP collection start command to the TIP control unit 26 through a dedicated bus. The TIP collection start command data is a signal that causes the TIP data to be collected. Thus, since the data amount of the TIP collection start command is small, it hardly affects the transmission amount of the control bus 4. Consequently, the TIP collection start command data can be transmitted through the control bus 4.

When the TIP control unit 26 has received the TIP collection start command from the TIP controller 27, the TIP control unit 26 causes the TIP detector to be inserted into the core of the nuclear reactor, it to be traveled in the core, and a read timing signal at each of predetermined positions to be output to the TIP controller 27. The TIP control unit 26 always outputs the measured value of the TIP detector to the TIP controller 27. Whenever inputting a read timing signal, the TIP controller 27 stores the measured value of the TIP detector.

While the TIP detector is being traveled in the core, the measured value of the TIP detector corresponding to the read timing signal is collected. Since the read timing signal is output on millisecond order, the TIP controller 27 should perform a collecting process on millisecond order. While the TIP detector is being traveled in the core, the TIP controller 27 collects the measured value of the TIP detector. The TIP controller 27 determines whether the collecting process is completed corresponding to the number of the read timing signals. The TIP controller 27 transmits the collected TIP data to the TIP server 28 through the control bus 4. The TIP server 28 stores the collected TIP data.

Since the data mount of the collected TIP data is relatively small, it is always transmitted and the data amount transmitted through the control bus 4 is kept constant so as to prevent the transmission amount of the control bus 4 from being affected.

As described above, according to the ninth embodiment of the present invention, since the measured value of the TIP detector is collected by the TIP controller 27 rather than the TIP server 28 that performs the even process. The TIP controller 27 is connected to the TIP control unit 26 through the dedicated bus. Thus, the measured value can be collected at high speed (on millisecond order). In addition, the control bus 4 can transmit process data having a relatively constant amount at intervals of a predetermined time period without a delay. Consequently, a plant supervisory system that supervises the latest process data can be provided.

(Tenth Embodiment)

Figure 18:
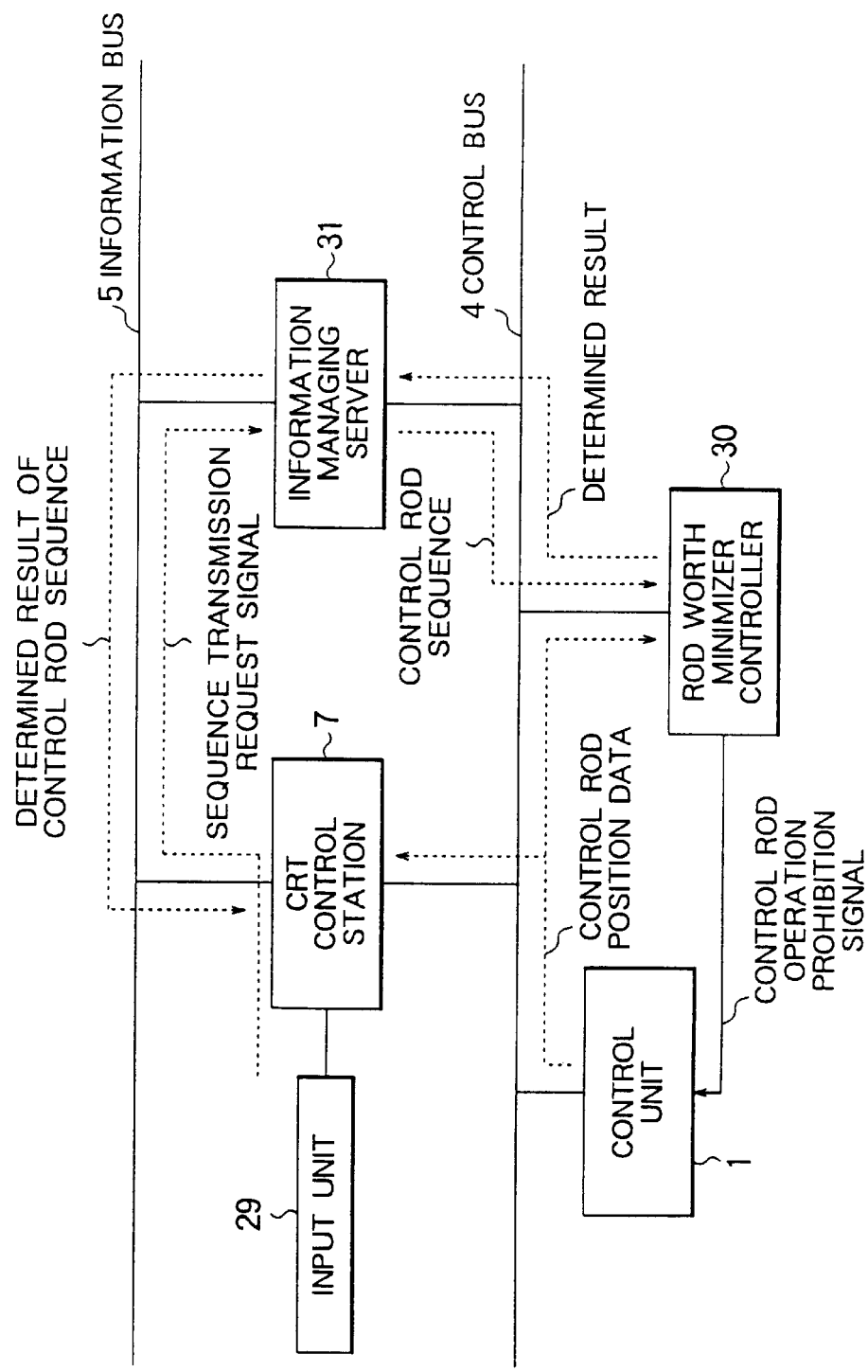
FIG. 18 is a block diagram showing the constitution of a plant supervisory system according to a tenth embodiment of the present invention.
Figure 19:
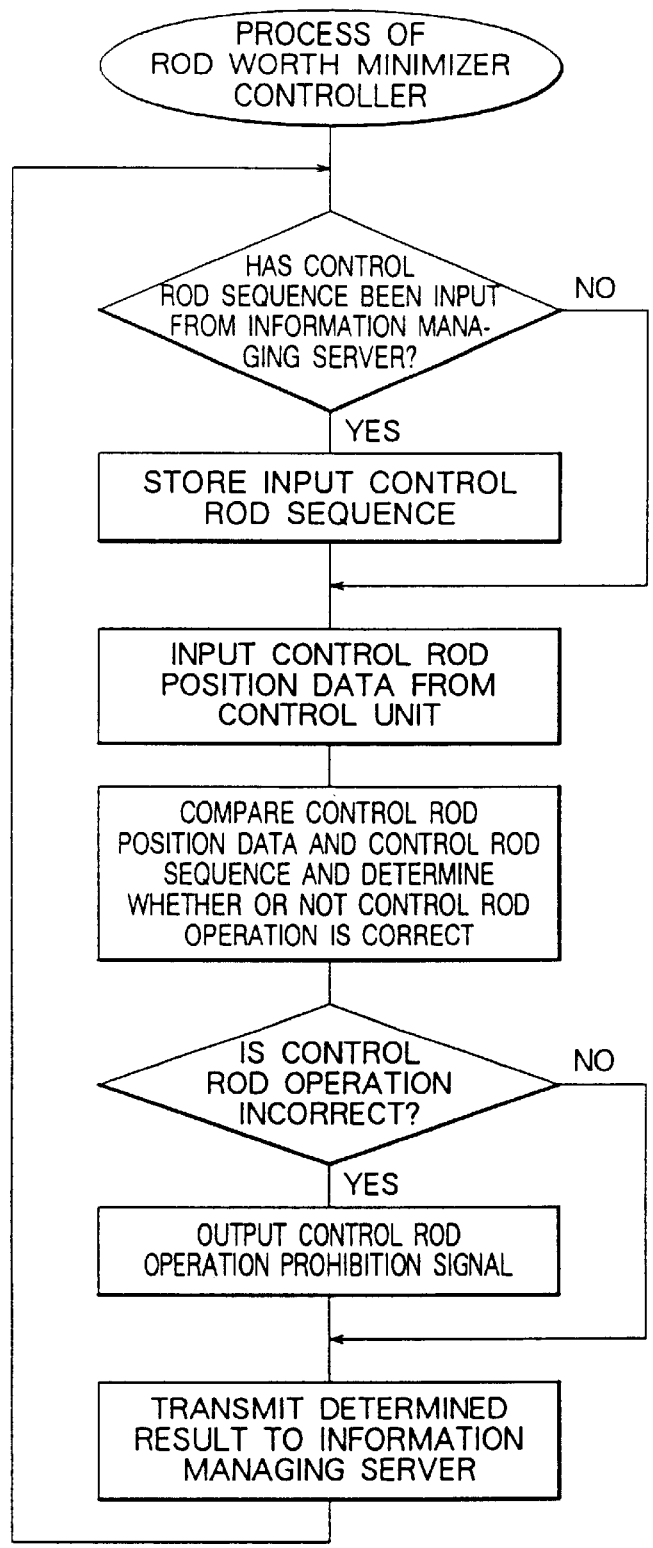
FIG. 19 is a flow chart showing a process of a rod worth minimizer controller according to the tenth embodiment of the present invention.

FIG. 18 is a block diagram showing the constitution of a plant supervisory system according to a tenth embodiment of the present invention. FIG. 19 is a flow chart showing a process of a rod worth minimizer controller according to the tenth embodiment of the present invention.

The plant supervisory system according to the tenth embodiment comprises a control unit 1, a rod worth minimizer controller 30, a CRT control station 7, an information managing server 31, and an input unit 29. The rod worth minimizer controller 30 determines whether or not the control rod operation is available corresponding to a control rod sequence of the nuclear reactor and outputs a control rod operation prohibition signal to the control unit 1 through a dedicated bus. The CRT control station 7 is connected to the control unit 1 and the rod worth minimizer controller 30 through a control bus 4. The input unit 29 is connected to the CRT control station 7. In addition, the CRT control station 7 and the information managing server 31 are connected through an information bus 5.

Next, the operation of the plant supervisory system according to the tenth embodiment will be described.

The control unit 1 transmits control rod position data to the rod worth minimizer controller 30 and the CRT control station 7 through the control bus 4. The CRT control station 7 inputs the control rod position data from the control bus 4 and displays the data. The CRT control station 7 transmits a sequence transmission request signal received from an input unit 29 to the information managing server 31 through the information bus 5. The information managing server 31 transmits a control rod sequence to the rod worth minimizer controller 30 through the control bus 4 corresponding to the sequence transmission request signal.

The control rod sequence is procedure data that defines an operation sequence of the control rods of the nuclear reactor. The operation of the control rods of the nuclear reactor should be performed corresponding to the control rod sequence. The rod worth minimizer controller 30 inputs the control rod sequence through the control bus 4 and stores it.

In addition, the rod worth minimizer controller 30 compares the stored control rod sequence and the control rod position data that is input from the control unit 1 through the control bus 4 and determines whether or not the control rod operation has been performed corresponding to the control rod sequence. The rod worth minimizer controller 30 transmits the determined result to the information managing server 31 through the control bus 4. When the control rod operation has not been performed corresponding to the control rod sequence, the rod worth minimizer controller 30 outputs the control rod operation prohibition signal to the control unit 1. The determined result is stored in the information managing server 31.

Since the data amounts of the control rod sequence and the determined result are small, they hardly affect the transmission amount of the control bus 4. Thus, control rod sequence and the determined result can be transmitted through the control bus 4.

The CRT control station 7 inputs the determined result and the control rod sequence from the information managing server 31 through the information bus 5 corresponding to a guide display request for an operation state of the control rods. The CRT control station 7 performs a calculating process for the determined result and the control rod sequence, displays a guide of the operation state of the control rods, inputs control rod position data, and displays the latest control rod position. The control rod sequence and the determined result are transmitted from the information managing server 31 to the CRT control station 7 through the information bus 5. When a plurality of CRT control stations 7 issue a guide display request for the operation state of the control rods, since the data transmission amount increases, the control rod sequence and the determined result are transmitted through the information bus 5.

As described above, according to the tenth embodiment of the present invention, the function for comparing the control rod sequence and the control rod operation is assigned to a dedicated unit rather than a functional server. The dedicated unit is connected to the control bus 4. In addition, the control rod operation prohibition signal is transmitted to the control unit 1 through the dedicated bus. Thus, the responsiveness can be improved. In addition, against an error of the operation of the control rods, the control rod operation prohibition signal can be promptly output.

Since the determined result is transmitted to the CRT control station 7 through the control bus 4, a guide for the operation of the control rods can be promptly presented to the operator. Moreover, the control bus 4 can transmit control rod position data having a constant amount at intervals of a predetermined time period without a delay. Thus, the latest data of the positions of the control rods can be supervised.

(Eleventh Embodiment)

Figure 20:
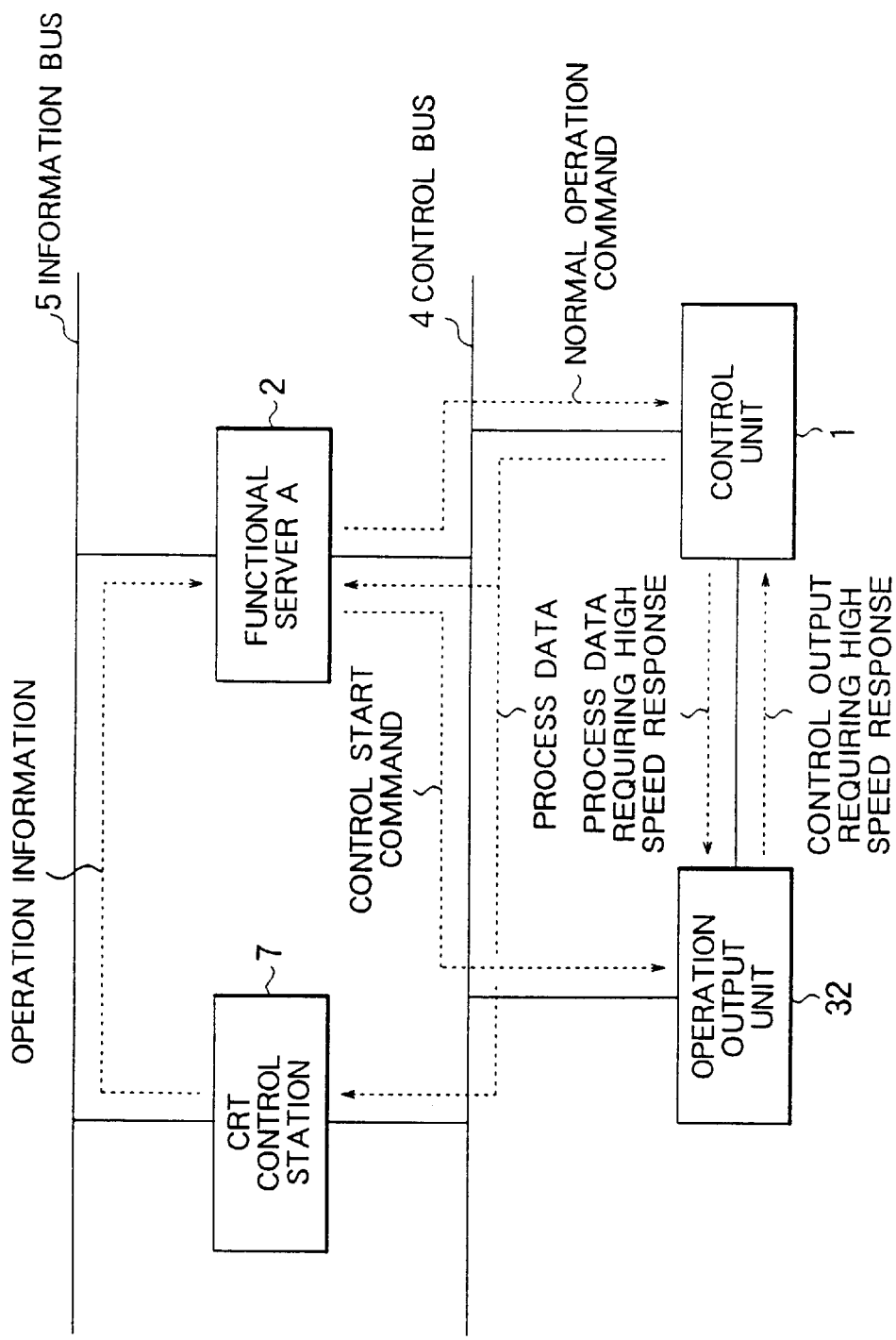
FIG. 20 is a block diagram showing the constitution of a plant supervisory system according to an eleventh embodiment of the present invention.

FIG. 20 is a block diagram showing the constitution of a plant supervisory system according to an eleventh embodiment of the present invention.

The plant supervisory system according to the eleventh embodiment comprises a control unit 1, an operation output unit 32, a CRT control station 7, and a functional server A 2. The operation output unit 32 is connected to the control unit 1 through a dedicated high speed bus or a process inputting/output unit. The operation output unit 32 performs a target value controlling process that requires a high speed response. The CRT control station 7 is connected to the operation output unit 32 and the control unit 1 through a control bus 4. The CRT control station 7 and the functional server A 2 are also connected through an information bus 5.

Next, the operation of the plant supervisory system according to the eleventh embodiment will be described. The functional server A 2 determines the operation state of the plant corresponding to operation information such as automatic operation enable signal received from the CRT control station 7 through the information bus 5 and process data that is input from the control unit 1 through the control bus 4 and outputs a predetermined control command to the control unit 1 through the control bus 4. Control commands are categorized as high speed commands that require a high speed response corresponding to variation of process data of the control unit 1 and other normal operation commands. A normal operation command is output to the control unit 1 through the control bus 4.

The control bus 4 transmits process data and operation commands at intervals of a predetermined time period so as to keep the transmission amount constant. Thus, the control bus 4 cannot be used for a command that requires a high speed response corresponding to variation of process data.

For a command that requires high speed response, the functional server A 2 outputs a control start command to the operation output unit 32. The operation output unit 32 is connected to the control unit 1 through a dedicated high speed bus or a process inputting/output unit. The operation output unit 32 can input process data from the control unit 1 and outputs such a high speed command to the control unit 1. When the operation output unit 32 inputs a control start command from the functional server A 2, the operation output unit 32 performs a predetermined controlling process for the control start command corresponding to process data received from the control unit 1 through the dedicated high speed bus or the process inputting/output unit.

In the eleventh embodiment, the functional server A 2 receives operation information from the CRT control station 7 through the information bus 5. Alternatively, an operation console or the like is connected to a process inputting/output unit of the operation output unit 32 so as to output operation information to the functional server A 2 through the control bus 4.

As described above, according to the eleventh embodiment, since the operation output unit 32 that performs a controlling process requiring a high speed response corresponding to a control command received from the functional server A 2 is disposed, the transmission amount and the transmission capacity of the control bus 4 can be more suppressed than the case that the functional server A 2 performs such a controlling process. In addition, a controlling process that requires a high speed response can be accomplished.

(Twelfth Embodiment)

Figure 21:
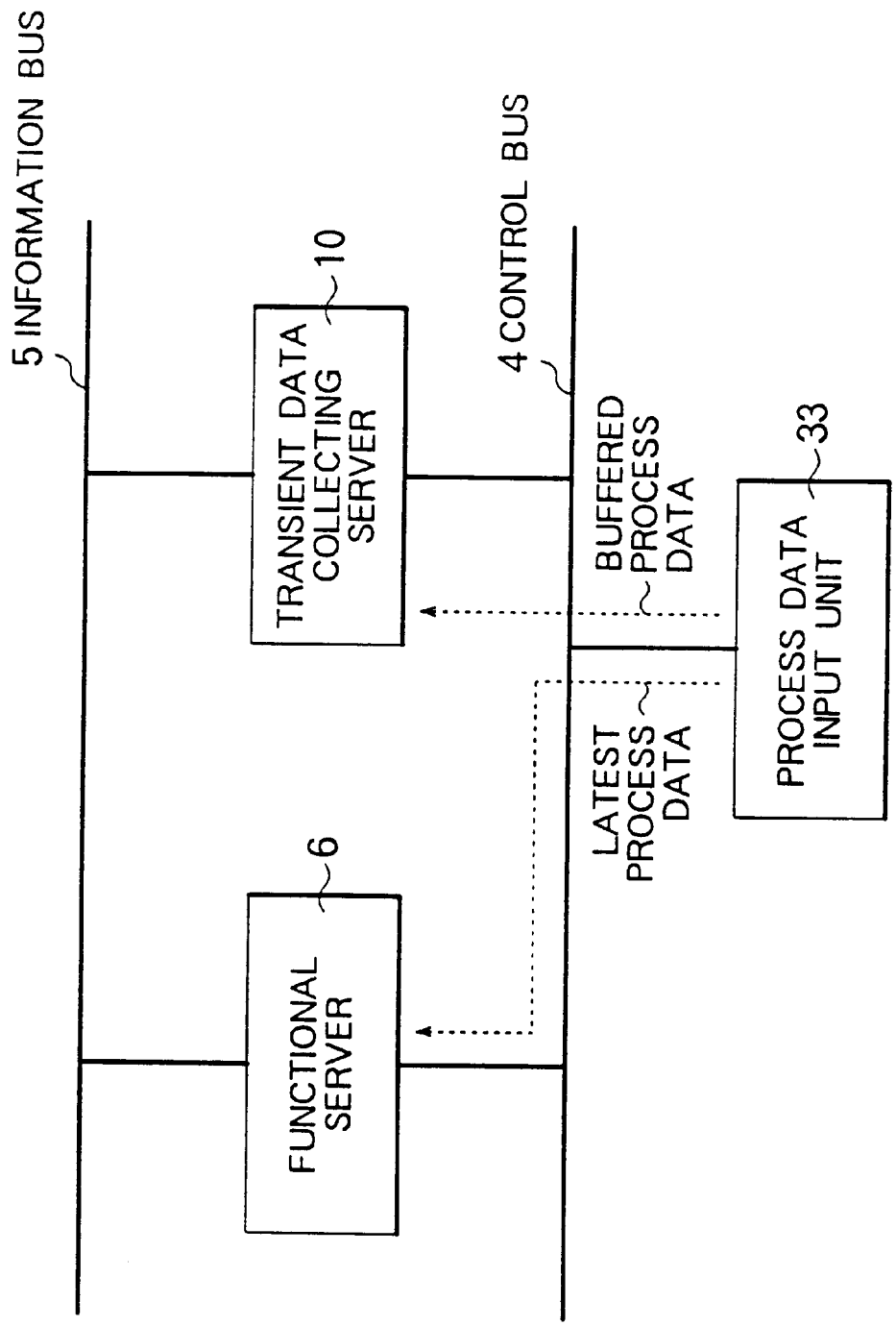
FIG. 21 is a block diagram showing the constitution of a plant supervisory system according to a twelfth embodiment of the present invention.
Figure 22:
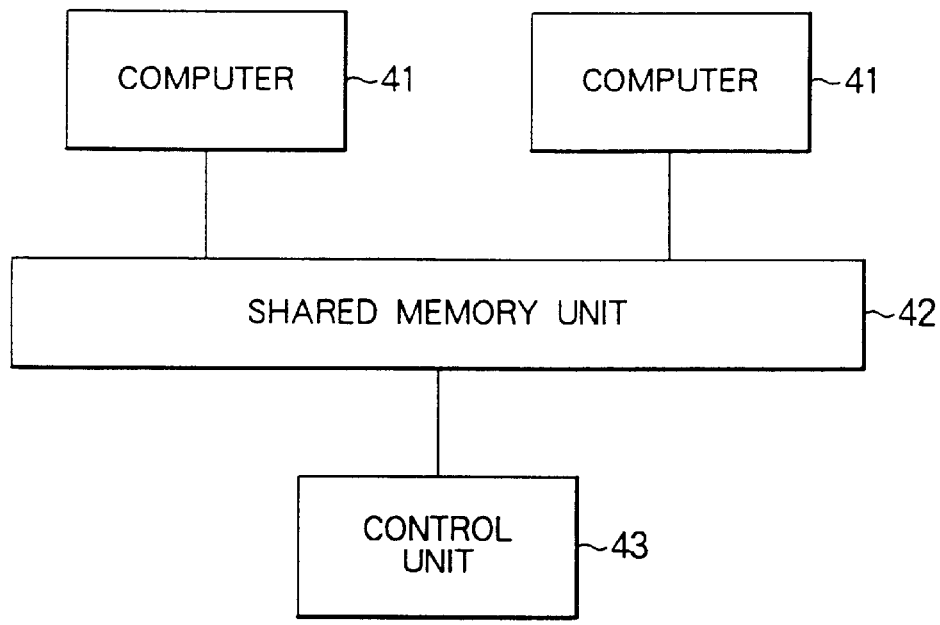
FIG. 22 is a block diagram showing an example of the constitution of a conventional function-distributed plant supervisory system.
Figure 23:
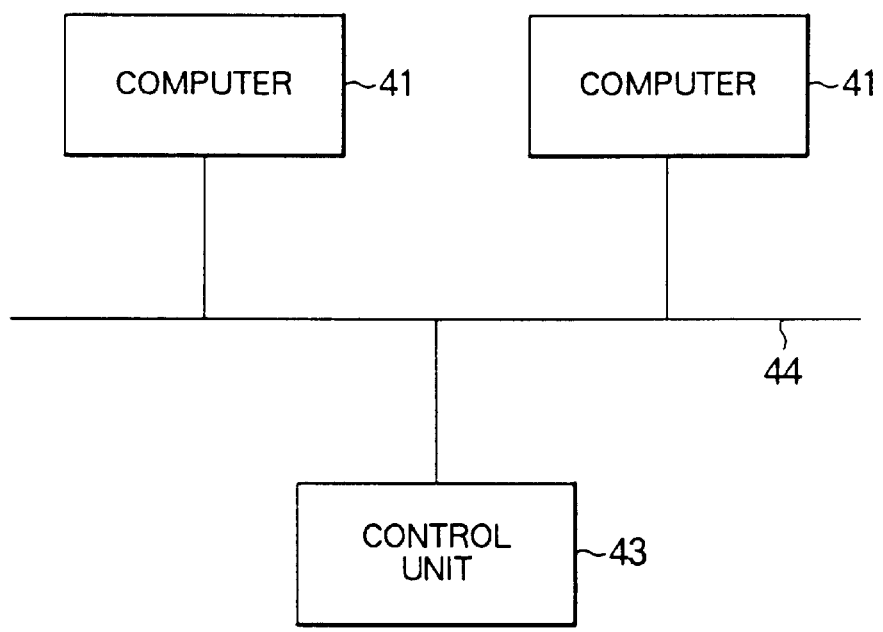
FIG. 23 is a block diagram showing an example of the constitution of a function-distributed system connected through a network.

FIG. 21 is a block diagram showing the constitution of a plant supervisory system according to a twelfth embodiment of the present invention. In the twelfth embodiment, a process data input unit 33 is connected to a control bus 4. The process data input unit 33 has a function for inputting process data from the plant and transmitting buffered data and a function for transmitting an instantaneous value of process data. A functional server 6 and a transient data collecting server 10 are connected to the control bus 4 and an information bus 5.

Next, the operation of the plant supervisory system according to the twelfth embodiment will be described.

The process data input unit 33 inputs process data from each sensor of the plant, buffers the input process data for a predetermined time period, and transmits it to the transient data collecting server 10 through the control bus 4. The transient data collecting server 10 is a server that collects plant data in the case that an event takes place in the plant. Thus, the transient data collecting server 10 should collect process data on several millisecond basis without a data drop. However, it is difficult for the transient data collecting server 10 to transmit process data to the control bus 4 at intervals of several milliseconds and for the transient data collecting server 10 to collect it at intervals of several milliseconds through the control bus 4 due to the responsiveness of the transient data collecting server 10. To solve such a problem, the process data input unit 33 buffers process data for a predetermined time period and transmits the buffered data to the transient data collecting server 10 so as to collect process data on several milliseconds order.

On the other hand, the functional server 6 requires the latest value of process data rather than delayed data that has been buffered so as to supervise the current state of the plant. Thus, the process data input unit 33 has a function for transmitting the latest process data at intervals of a predetermined time period through the control bus 4. In such a manner, the functional server 6 inputs the latest process data, supervises it, and performs a calculating process for the process data.

In the twelfth embodiment, data is transmitted from the process data input unit 33 to the transient data collecting server 10 through the control bus 4. Alternatively, the data may be transmitted through another transmission path rather than the control bus 4.

Thus, according to the twelfth embodiment, since the process data input unit 33 has a function for transmitting two types of data, the number of data input units can be decreased.

As described above, according to the plant supervisory system of the present invention, many functional servers such as computers are connected through a network. The functional servers can distributively perform a process without a delay of transmission of plant data.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A plant supervisory system for inputting process data of a plant from a control unit and supervising the plant, comprising:
   a plurality of functional servers for inputting the process data and distributive performing calculating processes necessary for supervising the plant;
   a first transmission path for transmitting data shared within the control unit and said functional servers; and
   a second transmission path for transmitting data shared within said functional servers, the second transmission path being independent of the first transmission path, wherein the data transmitted by the second transmission path is not shared within the control unit and said functional servers.

2. The plant supervisory system as set forth in claim 1, wherein said first transmission path is a control bus for transmitting said process data from said control unit or a sensor of the plant to either functional servers, and output data of said functional servers to said control unit with a high speed period required for plant control; and
   said second transmission path is a information bus for transmitting the data, whose amount varies depending on the event process of said functional server, to other functional servers.

3. The plant supervisory system as set forth in claim 1, wherein said functional servers include:
   a display control station for inputting the process data and output data of the other functional servers and displaying information of the plant.

4. The supervising system as set forth in claim 1, wherein said functional servers include:
   a supervising server for inputting the process data and determining whether or not the process data is abnormal corresponding to a state change of the plant, the variation of process amount of said supervising server being large; and
   a performance calculating server for inputting the process data and periodically performing a performance evaluating calculation for the plant, the process amount of said performance calculating server being constant.

5. The plant supervisory system as set forth in claim 1, wherein said functional servers include:
   a supervising server for inputting the process data and determining whether or not the process data is abnormal corresponding to a state change of the plant;
   a plant operation assisting server for inputting the process data and assisting the operation of the plant;
   a data collecting server for inputting the process data and collecting history data of the plant; and
   a history data processing server for extracting history data of said data collecting server through said second transmission path and outputting the extracted history data,
   wherein at least said supervising server and said data collecting server are redundantly constituted.

6. The plant supervisory system as set forth in claim 1, wherein said functional servers include:
   an information managing server for inputting, storing, and managing the process data and output data of the other functional servers.

7. The plant supervisory system as set forth in claim 6, wherein the other functional serves are redundantly constituted, and
   wherein one of the redundantly constituted functional servers is transferred to the other thereof with data stored in said information managing server through said second transmission path.

8. A plant supervisory system for inputting process data of a plant and supervising the plant, comprising:
   a traversing incore probe (TIP) control unit for causing TIP to measure a TIP level corresponding to a control command;
   a TIP level collecting unit for transmitting the control command to said TIP control unit and collecting the TIP level from said TIP control unit;
   a display control station for inputting the process data and displaying information of the plant;
   a TIP server for outputting the control command to said TIP level collecting unit corresponding to a TIP level collection start request that is input through said display control station and storing data collected by said TIP level collecting unit;
   a first transmitting path for transmitting data shared with in said TIP level collecting unit and said display control station and in said TIP level collecting unit and said TIP server; and a second transmission path for transmitting data shared with in said display control station and said TIP server.

9. A plant supervisory system for inputting process data of a plant and supervising the plant, comprising:

a first transmission path;

a control unit, connected to said first transmission path, for performing a control rod operation corresponding to a control rod operation command and outputting control rod position data;

an information managing server for storing and managing control rod sequence data and data transmitted from said control unit through said first transmission path;

a display control station for inputting the process data transmitted through said transmission path, displaying information of the plant, receiving a control rod operation request, and outputting the control rod operation command;

a rod worth minimizer controller, connected to said first transmission path, for determining whether or not the control rod operation is available corresponding to the control rod sequence received from said information managing server and the control rod position data received from said control unit and outputting a control rod operation prohibition signal to said control unit corresponding to the determined result; and a second transmission path for exchanging data between said information managing server and said display control station.

10. A plant supervisory system for inputting process data of a plant from a control unit and supervising the plant, comprising:

a first transmission path and a second transmission path;

a display control station for inputting the process data from the control unit through said first transmission path and displaying information of the plant;

a functional server for inputting operation information from said display control station through said second transmission path and outputting a target value control command or a unit operation command for said control unit to said first transmission path corresponding to the process data; and an operation output unit for outputting a high speed periodic operation command to said control unit by dedicated connecting means corresponding to the target value control command received from said functional server through said first transmission path.

11. A plant supervisory system for inputting process data of a plant and supervising the plant, comprising:

a first transmission path;

a process data input unit for inputting process data through a aid first transmission path and performing in parallel a process for outputting an instantaneous value and a process for outputting buffered data of the input process data;

a functional server for inputting the instantaneous value from said process data input unit through said first transmission path and performing a calculating process for supervising the plant;

a high speed data recording server for inputting the buffered data from said process data input unit through said first transmission path and recording the data at high speed; and a second transmission path for exchanging data between said functional server and said high speed data recording server.

* * * * *